US010397334B2

(12) United States Patent
Takahashi et al.

(10) Patent No.: US 10,397,334 B2
(45) Date of Patent: Aug. 27, 2019

(54) INFORMATION SHARING SYSTEM, INFORMATION SHARING METHOD, AND NON-TRANSITORY COMPUTER-READABLE RECORDING MEDIUM ENCODED WITH INFORMATION SHARING PROGRAM

(71) Applicant: Konica Minolta, Inc., Chiyoda-ku, Tokyo (JP)

(72) Inventors: Kazusei Takahashi, Nishinomiya (JP); Hirokazu Kubota, Otsu (JP); Masaya Hashimoto, Itami (JP); Takehisa Yamaguchi, Ikoma (JP); Hiroaki Kubo, Muko (JP); Toshimichi Iwai, Nara-ken (JP); Atsushi Tamura, Amagasaki (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 192 days.

(21) Appl. No.: 15/450,803

(22) Filed: Mar. 6, 2017

(65) Prior Publication Data
US 2017/0272521 A1    Sep. 21, 2017

(30) Foreign Application Priority Data

Mar. 15, 2016 (JP) ................. 2016-050813

(51) Int. Cl.
*G06F 15/173* (2006.01)
*H04L 29/08* (2006.01)

(52) U.S. Cl.
CPC .............. *H04L 67/14* (2013.01); *H04L 67/26* (2013.01); *H04L 67/28* (2013.01)

(58) Field of Classification Search
CPC ......... H04L 67/14; H04L 67/28; H04L 67/26; H04L 29/08
See application file for complete search history.

(56) References Cited

U.S. PATENT DOCUMENTS

2014/0365334 A1* 12/2014 Hurewitz ........... G06Q 30/0613
                                                    705/26.41
2015/0005011 A1*  1/2015 Nehrenz ................. H04W 4/02
                                                    455/456.3

(Continued)

FOREIGN PATENT DOCUMENTS

JP          2006-311013 A      11/2006

*Primary Examiner* — Cheikh T Ndiaye
(74) *Attorney, Agent, or Firm* — Buchanan Ingersoll & Rooney PC

(57) ABSTRACT

A management server communicable with portable information devices includes: a group generating portion that generates a group to which two or more portable information devices belong; an identification information receiving portion that receives the identification information from a transmission source device, which receives from any one of fixed terminals each located geographically at a fixed position, identification information corresponding to related information assigned to the fixed terminal; a group determining portion that, in response to receipt of the identification information from the transmission source device, determines a group to which the transmission source device belongs; and a linked transmitting portion that transmits the identification information received from the transmission source device, in order to allow each of one or more portable information devices which belong to the group determined, to display the related information corresponding to the identification information received from the transmission source device.

17 Claims, 25 Drawing Sheets

(56) References Cited

U.S. PATENT DOCUMENTS

| | | | |
|---|---|---|---|
| 2015/0079942 A1* | 3/2015 | Kostka | H04W 4/21 455/411 |
| 2015/0242911 A1* | 8/2015 | Zises | G06Q 30/0605 705/14.64 |
| 2016/0012196 A1* | 1/2016 | Mark | G06Q 10/00 705/2 |
| 2016/0335666 A1* | 11/2016 | Dodor | H04W 4/029 |
| 2017/0311137 A1* | 10/2017 | Bennett | H04W 4/02 |

\* cited by examiner

F I G. 1
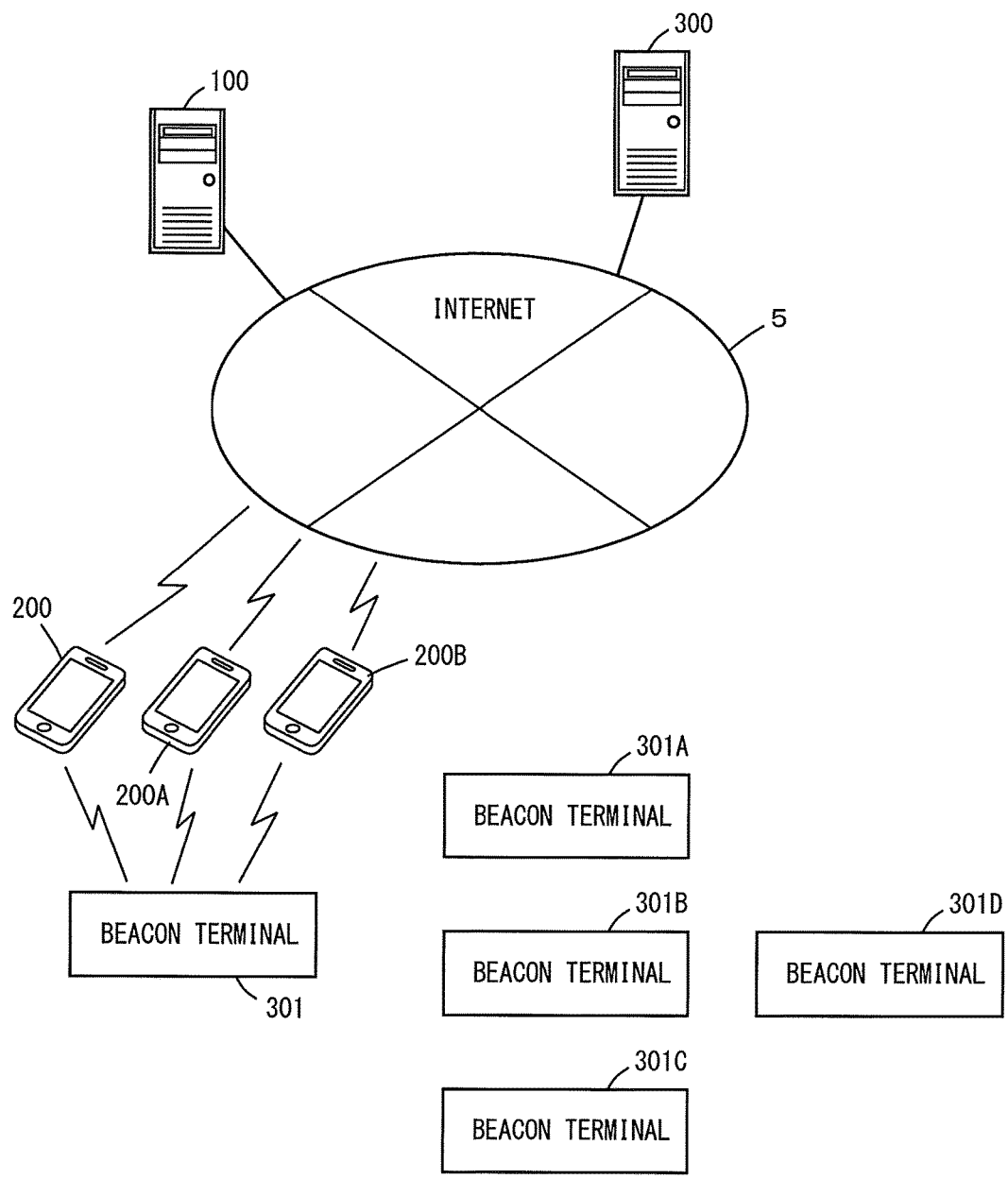

F I G. 5
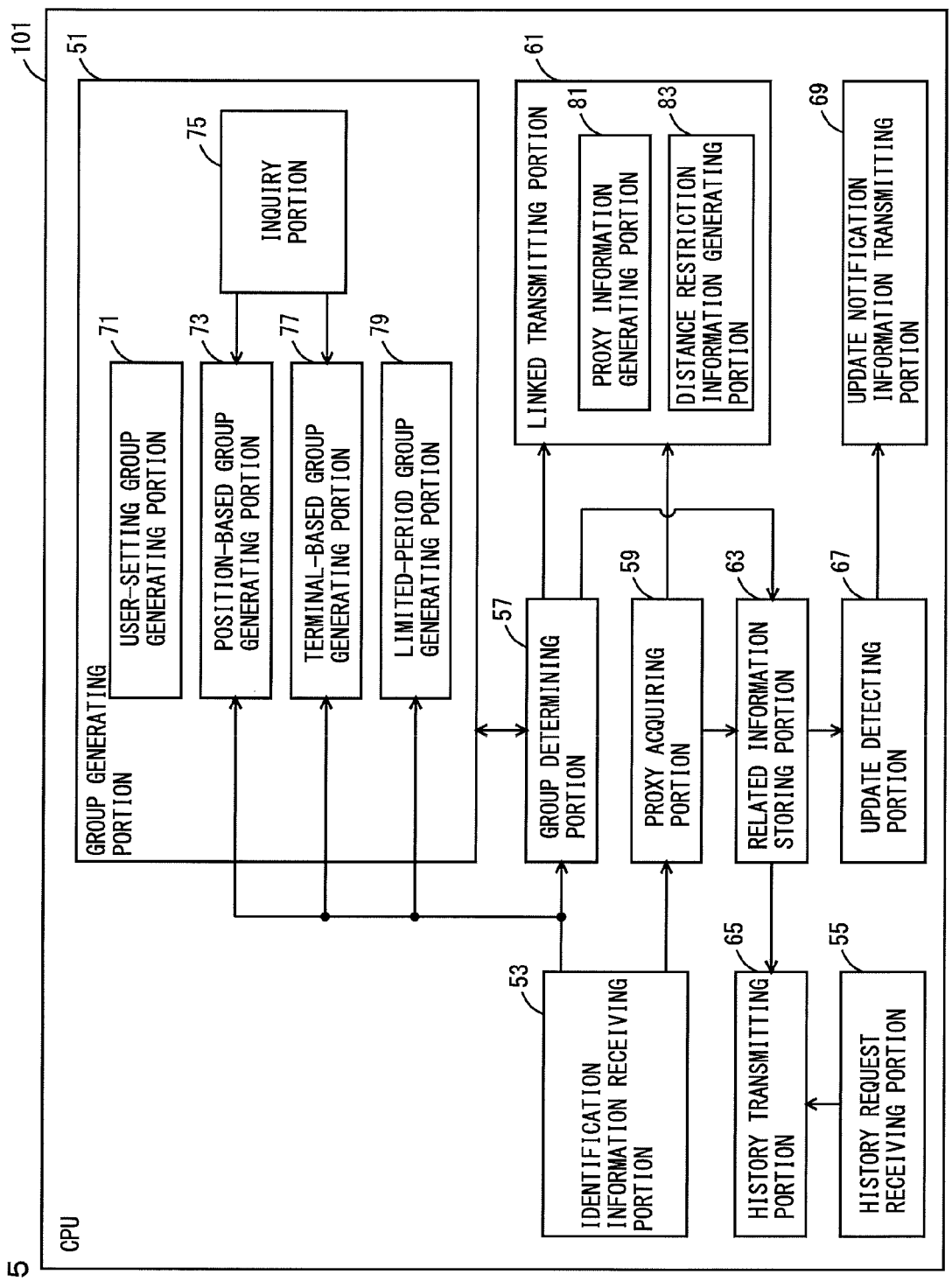

FIG. 6

```
┌─────────────────────────────────────────────────────────┐
│              USER-SETTING GROUP SETTING                  │
├─────────────────────────────────────────────────────────┤
│  ┌───────────────────────────────────────────────────┐  │
│  │ PLEASE SELECT A METHOD OF REGISTERING MOBILE TERMINALS │
│  │ FOR SHARING.                                      │  │
│  └───────────────────────────────────────────────────┘  │
│                                                          │
│       ☐  REGISTER AUTOMATICALLY                          │
│                                                          │
│       ☒  REGISTER MANUALLY                               │
│          (PLEASE INPUT NAME OR MAC ADDRESS OF DEVICE.)   │
│                                                          │
│            FIRST TERMINAL  ( TERMINAL A       )          │
│            SECOND TERMINAL ( TERMINAL B       )          │
│            THIRD TERMINAL  ( TERMINAL C       )          │
│            FOURTH TERMINAL (                  )          │
│            FIFTH TERMINAL  (                  )          │
│            SIXTH TERMINAL  (                  )          │
│                                                          │
│                              ┌──────────────────────┐    │
│                              │ BUTTON TO ADD THE NUMBER │
│                              │ OF TERMINAL REGISTRATIONS│
│                              └──────────────────────┘    │
└─────────────────────────────────────────────────────────┘
```

FIG. 7

GROUP INFORMATION

| GROUP IDENTIFICATION INFORMATION | No1 |
|---|---|
| DEVICE IDENTIFICATION INFORMATION | TERMINAL A |
| | TERMINAL B |
| | TERMINAL C |

F I G. 8

```
┌─────────────────────────────────────────────────────────────┐
│              POSITION-BASED GROUP SETTING                   │
├─────────────────────────────────────────────────────────────┤
│  ┌─────────────────────────────────────────────────────┐    │
│  │ PLEASE SELECT A METHOD OF REGISTERING MOBILE TERMINALS│  │
│  │ FOR SHARING.                                        │    │
│  └─────────────────────────────────────────────────────┘    │
│                                                             │
│   [X] REGISTER AUTOMATICALLY                                │
│         ·THRESHOLD VALUE OF RECEIVING TIME FOR GROUPING     │
│          MOBILE TERMINALS                                   │
│              GENERATION PERIOD OF TIME: ( 1 ) MINUTE(S)     │
│            ATTENTION: ABOVE TIME SETTING SHOULD BE CONSIDERED│
│            ONLY FOR GROUPING.                               │
│                                                             │
│         ·MAXIMUM NUMBER OF MOBILE TERMINALS ELIGIBLE        │
│          FOR REGISTRATION IN THE SAME GROUP                 │
│              MAXIMUM NUMBER OF TERMINALS: ( 5 ) TERMINALS   │
│   [ ] REGISTER MANUALLY                                     │
│       (PLEASE INPUT UNIQUE ID OR MAC ADDRESS OF TERMINAL.)  │
│            FIRST TERMINAL  ( TERMINAL A         )           │
│            SECOND TERMNAL  ( TERMINAL B         )           │
│            THIRD TERMINAL  ( TERMINAL C         )           │
│            FOURTH TERMINAL (                    )           │
│            FIFTH TERMINAL  (                    )           │
│            SIXTH TERMINAL  (                    )           │
│                              ┌──────────────────────────┐   │
│                              │ BUTTON TO ADD THE NUMBER │   │
│                              │ OF TERMINAL REGISTRATIONS│   │
│                              └──────────────────────────┘   │
└─────────────────────────────────────────────────────────────┘
```

F I G. 9

```
┌─────────────────────────────────────────────────────────────────┐
│                   TERMINAL-BASED GROUP SETTING                   │
├─────────────────────────────────────────────────────────────────┤
│  ┌───────────────────────────────────────────────────────┐      │
│  │ PLEASE SELECT A METHOD OF REGISTERING MOBILE TERMINALS│      │
│  │ FOR SHARING.                                          │      │
│  └───────────────────────────────────────────────────────┘      │
│                                                                  │
│   ☐  THRESHOLD VALUE OF RECEIVING TIME FOR GROUPING MOBILE TERMINALS│
│         GENERATION PERIOD OF TIME: ( 1 ) MINUTE(S)              │
│                                                                  │
│         ATTENTION: ABOVE TIME SETTING SHOULD BE CONSIDERED ONLY FOR│
│                    GROUPING.                                     │
│   ☐  MAXIMUM NUMBER OF MOBILE TERMINALS ELIGIBLE FOR REGISTRATION│
│      IN THE SAME GROUP                                           │
│         MAXIMUM NUMBER OF TERMINALS: ( 5 ) TERMINALS            │
│                                                                  │
│   ☐  START WITH BEACON TERMINAL                                 │
│         STARTING POINT TERMINAL: BEACON A                       │
│         (NOTE) SELECT BEACON TERMINAL TO USE AS STARTING EVENT. │
│                PLEASE PUSH BUTTON BELOW TO SET BEACON TERMINAL. │
│                                                                  │
│                    ┌─────────────────────┐                      │
│                    │  SET BEACON TERMINAL │                      │
│                    └─────────────────────┘                      │
│                                                                  │
│   ☐  END WITH BEACON TERMINAL                                   │
│         END POINT TERMINAL: BEACON D                            │
│         (NOTE) SELECT BEACON TERMINAL TO USE AS END EVENT.      │
│                PLEASE PUSH BUTTON BELOW TO SET BEACON TERMINAL. │
│                                                                  │
│                    ┌─────────────────────┐                      │
│                    │  SET BEACON TERMINAL │                      │
│                    └─────────────────────┘                      │
│                                                                  │
└─────────────────────────────────────────────────────────────────┘
```

F I G. 1 0

BEACON TERMINAL SETTING

◎PLEASE SELECT TO SET BEACON TERMINAL FROM A LIST BELOW.

| SELEC-TION | NUMBER | BEACON TERMINAL | NAME OF INFORMATION SENDER (COMPANY NAME) | RECEIVED DATE AND TIME |
|---|---|---|---|---|
| ☑ | 1 | | | MAY 2, 2015 18:52 |
| ☐ | 2 | | | MAY 3, 2015 20:37 |
| ☐ | 3 | | | MAY 5, 2015 21:28 |
| ☐ | 4 | | | JUN. 12, 2015 18:28 |
| ☐ | 5 | | | AUG. 31, 2015 15:43 |

PLEASE SELECT EXECUTION COMMAND FROM COMMAND BUTTONS BELOW.

| EXECUTE BEACON TERMINAL SETTING | ABOVE SELECTED BEACON TERMINAL IS SET. |
| VIEW RELATED INFORMATION | RELATED INFORMATION REGARDING ABOVE SELECTED BEACON TERMINAL IS DISPLAYED. |
| REFER TO LIST INCLUDED IN ANOTHER MOBILE TERMINAL | IF DESIRED BEACON TERMINAL DOES NOT EXIST IN ABOVE LIST, BEACON TERMINAL LIST STORED IN ANOTHER MOBILE TERMINAL IS DISPLAYED. |

F I G. 1 1

```
┌─────────────────────────────────────────────────────────────┐
│                  LIMITED-PERIOD GROUP SETTING               │
├─────────────────────────────────────────────────────────────┤
│                                                             │
│  ☐ DEVICE REGISTRATIONS                                     │
│      PLEASE INPUT NAME OR MAC ADDRESS OF DEVICE.            │
│                                                             │
│        FIRST TERMINAL  ( TERMINAL A        )                │
│        SECOND TERMINAL ( TERMINAL B        )                │
│        THIRD TERMINAL  ( TERMINAL C        )                │
│        FOURTH TERMINAL (                   )                │
│        FIFTH TERMINAL  (                   )                │
│        SIXTH TERMINAL  (                   )                │
│                         ┌──────────────────────────┐        │
│                         │ BUTTON TO ADD THE NUMBER │        │
│                         │ OF TERMINAL REGISTRATIONS│        │
│                         └──────────────────────────┘        │
│                                                             │
│  ☐ START WITH BEACON TERMINAL                               │
│      STARTING POINT TERMINAL: BEACON A                      │
│      (NOTE) SELECT BEACON TERMINAL TO USE AS STARTING EVENT.│
│             PLEASE PUSH BUTTON BELOW TO SET BEACON TERMINAL.│
│                      ┌────────────────────┐                 │
│                      │ SET BEACON TERMINAL│                 │
│                      └────────────────────┘                 │
│                                                             │
│  ☐ END WITH BEACON TERMINAL                                 │
│      END POINT TERMINAL: BEACON D                           │
│      (NOTE) SELECT BEACON TERMINAL TO USE AS END EVENT.     │
│             PLEASE PUSH BUTTON BELOW TO SET BEACON TERMINAL.│
│                      ┌────────────────────┐                 │
│                      │ SET BEACON TERMINAL│                 │
│                      └────────────────────┘                 │
│                                                             │
└─────────────────────────────────────────────────────────────┘
```

F I G. 1 2

```
┌─────────────────────────────────────────────────────────────────┐
│                    UPDATE CONDITIONS SETTING                    │
├─────────────────────────────────────────────────────────────────┤
│                                                                 │
│   ┌───────────────────────────────────────────────────────┐     │
│   │ PLEASE SET CONFIRMATION FREQUENCY AND CONFIRMATION    │     │
│   │ PERIOD OF WHETHER CONTENTS HAVE BEEN UPDATED OR NOT.  │     │
│   └───────────────────────────────────────────────────────┘     │
│                                                                 │
│    1) CONFIRMATION FREQUENCY                                    │
│        PLEASE SET FREQUENCY OF ACCESS TO INFORMATION PROVIDING  │
│        SERVER TO CONFIRM WHETHER RELATED INFORMATION HAS BEEN   │
│        UPDATED OR NOT.                                          │
│          CONFIRMATION FREQUENCY:                                │
│              ONCE EVERY ( 7 ) DAYS, (   ) HOURS                 │
│          (ATTENTION) IF LESS THAN ONE DAY, PLEASE INPUT "0" TO DAYS │
│                      OR LEAVE DAYS BLANK.                       │
│                                                                 │
│    2) CONFIRMATION PERIOD                                       │
│        STARTING FROM THE DATE AND TIME WHEN THE FIRST MOBILE    │
│        TERMINAL RECEIVES IDENTIFICATION INFORMATION, WHAT IS    │
│        THE LONGEST PERIOD OF DAYS FOR CONFIRMATION OF WHETHER   │
│        RELATED INFORMATION HAS BEEN UPDATED OR NOT?             │
│          CONFIRMATION PERIOD: ( 14 ) DAYS                       │
│                                                                 │
│                                    ┌────────────────────────┐   │
│                                    │ SETTING COMPLETION BUTTON │ │
│                                    └────────────────────────┘   │
└─────────────────────────────────────────────────────────────────┘
```

FIG. 19

```
                    START TIMING SETTING

┌─────────────────────────────────────────┐
         │         PLEASE SET START TIMING.        │
         └─────────────────────────────────────────┘

☐  DESIGNATE TIME
              START TIME: AFTER ( 30 ) MINUTES
         (NOTE) IF 0 (ZERO) IS SET, INFORMATION SHARING IS STARTED
                RIGHT AFTER GROUP REGISTRATION IS STARTED.

☐  START MANUALLY (NOTE) IF THIS ITEM IS SELECTED, INFORMATION SHARING IS
                STARTED BETWEEN MOBILE TERMINALS REGISTERED TO GROUP.

☒  START WITH BEACON TERMINAL
            STARTING POINT TERMINAL: BEACON A
         (NOTE) SELECT BEACON TERMINAL TO USE AS STARTING EVENT.
                PLEASE PUSH BUTTON BELOW TO SET BEACON TERMINAL.

┌─────────────────────────┐
                    │    SET BEACON TERMINAL  │
                    └─────────────────────────┘
```

F I G. 2 0

```
┌─────────────────────────────────────────────────────────────┐
│                    END TIMING SETTING                        │
│  ┌─────────────────────────────────────────────────────┐    │
│  │              PLEASE SET END TIMING.                  │    │
│  └─────────────────────────────────────────────────────┘    │
│                                                              │
│   ☐ NON RECEIVED TIME INTERVAL                               │
│         NON RECEIVED TIME: ( 30 ) MINUTES                    │
│     (NOTE) INFORMATION SHARING IS FINISHED AFTER ABOVE       │
│            NON RECEIVED TIME HAS ELAPSED SINCE NO            │
│            IDENTIFICATION INFORMATION WAS RECEIVED.          │
│                                                              │
│   ☐ END MANUALLY                                             │
│     (NOTE) IF THIS ITEM IS SELECTED, INFORMATION SHARING IS  │
│            FINISHED BETWEEN MOBILE TERMINALS REGISTERED TO   │
│            GROUP.                                            │
│                                                              │
│   ☒ END WITH BEACON TERMINAL                                 │
│        END POINT TERMINAL: BEACON D                          │
│     (NOTE) SELECT BEACON TERMINAL TO USE AS END EVENT.       │
│            PLEASE PUSH BUTTON BELOW TO SET BEACON TERMINAL.  │
│                                                              │
│              ┌──────────────────────────────┐                │
│              │     SET BEACON TERMINAL      │                │
│              └──────────────────────────────┘                │
└─────────────────────────────────────────────────────────────┘
```

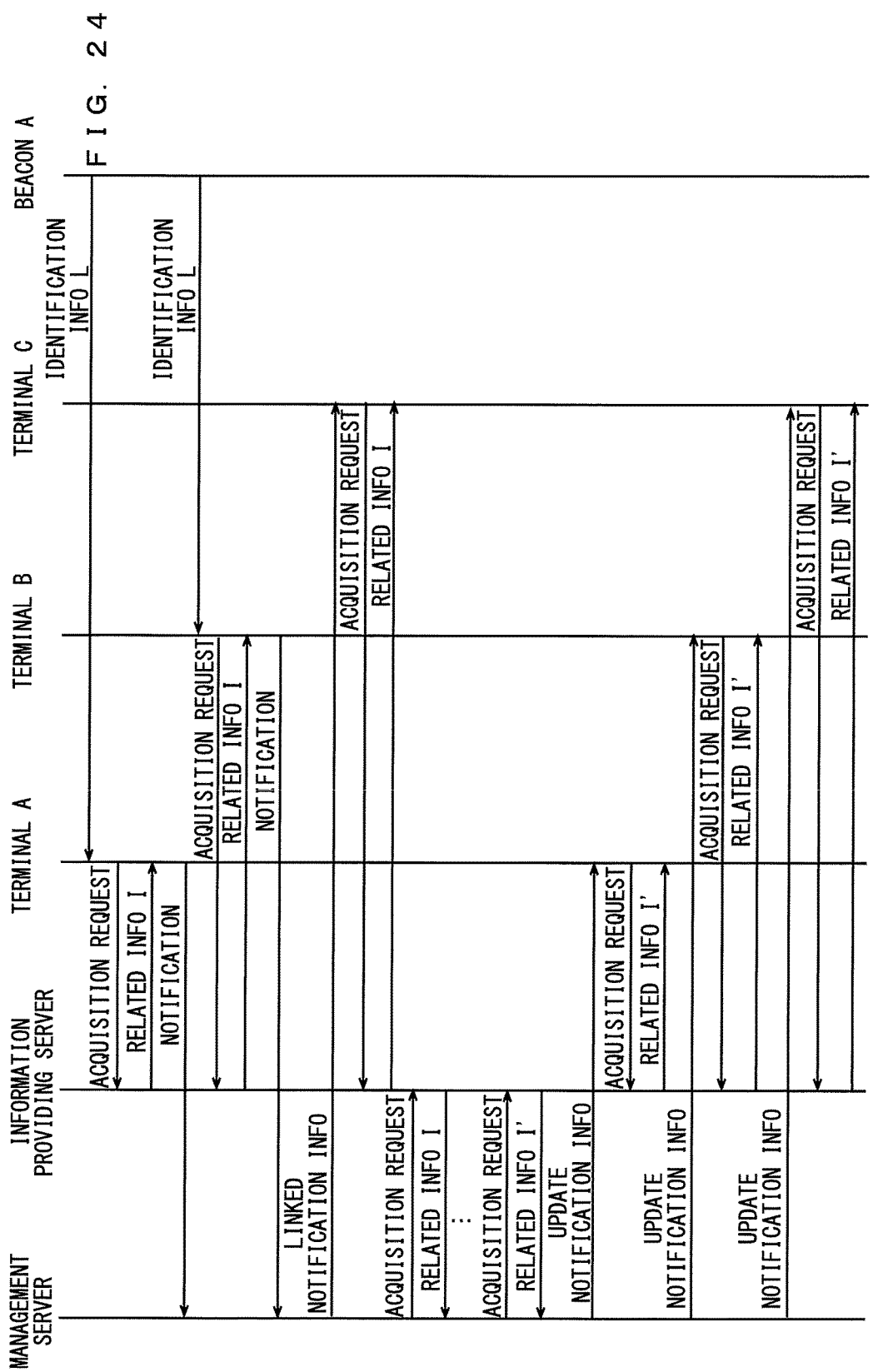

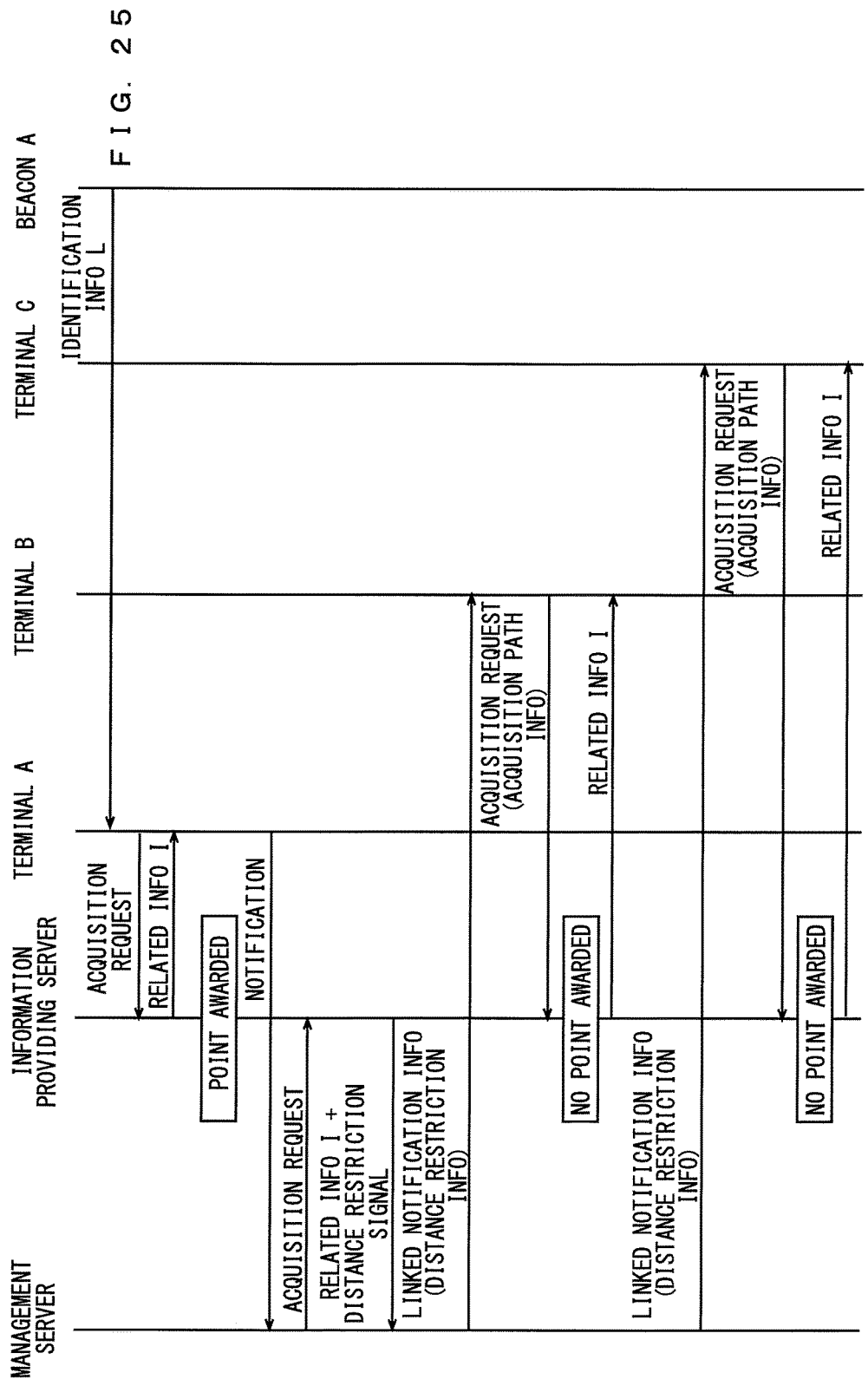

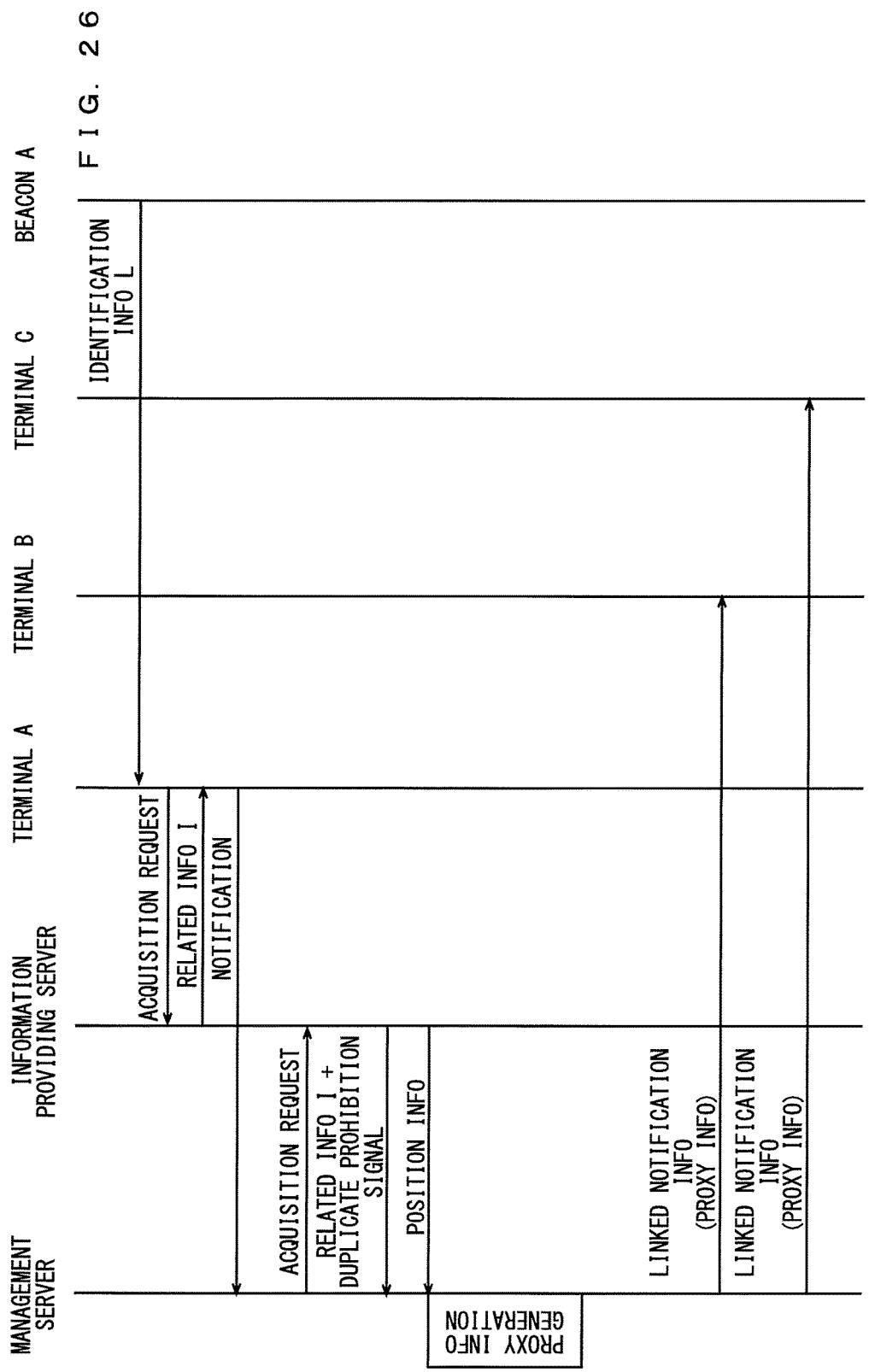

INFORMATION SHARING SYSTEM, INFORMATION SHARING METHOD, AND NON-TRANSITORY COMPUTER-READABLE RECORDING MEDIUM ENCODED WITH INFORMATION SHARING PROGRAM

The present U.S. patent application claims a priority under the Paris Convention of Japanese Patent Application No. 2016-050813 filed on Mar. 15, 2016, the entirety of which is incorporated herein by reference.

BACKGROUND OF THE INVENTION

Field of the Invention

The present invention relates to an information sharing system, an information sharing method, and a non-transitory computer-readable recording medium encoded with an information sharing program. More particularly, the present invention relates to an information sharing system in which a plurality of persons share the information associated with a position, an information sharing method which is performed in the information sharing system, and a non-transitory computer-readable recording medium encoded with an information sharing program.

Description of the Related Art

There is known a system which allows, using Bluetooth (registered trademark) Low Energy (BLE) standards, a portable information device existing within a range of a predetermined distance from a beacon terminal to acquire information. According to this system, a push notification can be made to a smartphone which exists within a range of a predetermined distance from the beacon terminal. However, the users to whom information is notified may be restricted to a large and unspecified number of users who exist within the range of a predetermined distance from the beacon terminal, whereas the users who exist outside the range of a predetermined distance from the beacon terminal cannot acquire the information. Therefore, there is a problem that the information provided from the beacon terminal cannot be shared among a plurality of users.

Meanwhile, Japanese Patent Laid-Open No. 2006-311013 describes a data distribution system which is capable of: upon distribution of data from a server to a large number of terminals, distributing by push type for store the data to a communication relay device located midway of the distribution; distributing by multicast an identifier of the distributed data from the server to the plurality of terminals; and acquiring by distributing by pull type from the terminal the data stored in the communication relay device. According to the technical art described in Japanese Patent Laid-Open No. 2006-311013, data can be shared among the plurality of users by transmitting the data, however, it requires inputting the transmission destinations, and thus the operation will be cumbersome.

SUMMARY OF THE INVENTION

An aspect of the present invention provides an information sharing system includes an information providing server, a plurality of fixed terminals each located geographically at a fixed position, a management server, and a plurality of portable information devices, wherein each of the plurality of portable information devices includes a first hardware processor. The first hardware processor includes: an identification information receiving portion configured to receive from any one of the plurality of fixed terminals; identification information corresponding to related information assigned to the fixed terminal; a related information acquiring portion configured to acquire the related information corresponding to the identification information from the information providing server, in response to receipt of the identification information; a notification portion configured to notify a user of the related information acquired by the related information acquiring portion; and an identification information transmitting portion configured to transmit the received identification information to the management server, in response to receipt of the identification information. The management server includes a second hardware processor, which includes: a group generating portion configured to generate a group to which two or more of the plurality of portable information devices; a group determining portion configured to, in response to receipt of the identification information from any one of the plurality of portable information devices, determine from among the generated groups, a group to which a transmission source device, which has transmitted the identification information among the plurality of portable information devices, belong; and a linked transmitting portion configured to, in response to receipt of the identification information, transmit the identification information received from the transmission source device to each of one or more portable information devices other than the transmission source device among the plurality of portable information devices which belong to the group determined. The first hardware processor further includes: a linked acquiring portion configured to, in response to receipt of the identification information from the management server, acquire from the information providing server, the related information corresponding to the identification information received from the management server; and a linked notification portion configured to notify a user of the related information acquired by the linked acquiring portion.

Another aspect of the present invention provides an information sharing method performed in an information sharing system including an information providing server, a plurality of fixed terminals each located geographically at a fixed position, a management server, and a plurality of portable information devices. The information sharing method causes each of the plurality of portable information devices to perform: an identification information receiving step of receiving from any one of the plurality of fixed terminals, identification information corresponding to related information assigned to the fixed terminal; a related information acquiring step of acquiring the related information corresponding to the identification information from the information providing server, in response to receipt of the identification information; a notification step of notifying a user of the related information acquired in the related information acquiring portion; and an identification information transmitting step of transmitting the received identification information to the management server, in response to receipt of the identification information. The information sharing method further causes the management server to perform: a group generating step of generating a group to which two or more of the plurality of portable information devices; a group determining step of, in response to receipt of the identification information from any one of the plurality of portable information devices, determining from among the generated groups, a group to which a transmission source device, which has transmitted the identification information among the plurality of portable information devices, belong; and a linked transmitting step of, in response to receipt of the identification information, transmitting the identification information received from the transmission source device to each of one or more portable information devices other than the transmission source device among the plurality of portable information devices which belong to the group determined. The information sharing method further causes each of the plurality of portable information devices to perform: a linked acquiring step of, in response to receipt of the identification information from the management server, acquiring from the information providing server, the related information corresponding to the identification information received from the management server; and a linked notification step of notifying a user of the related information acquired in the linked acquiring step.

A further aspect of the present invention provides a management server capable of communicating with a plurality of portable information devices, wherein the management server includes a hardware processor. The hardware processor includes: a group generating portion configured to generate a group to which two or more of the plurality of portable information devices belong; an identification information receiving portion configured to receive the identification information from a transmission source device among the plurality of portable information devices, which receives from any one of a plurality of fixed terminals each located geographically at a fixed position, identification information corresponding to related information assigned to the fixed terminal; a group determining portion configured to, in response to receipt of the identification information from the transmission source device, determine a group to which the transmission source device belongs from among the generated groups; and a linked transmitting portion configured to transmit the identification information received from the transmission source device, in order to allow each of one or more portable information devices other than the transmission source device among the plurality of portable information devices which belong to the group determined, to display the related information corresponding to the identification information received from the transmission source device.

A further aspect of the present invention provides an information sharing method performed by a management server capable of communicating with a plurality of portable information devices. The information sharing method causes the management server to perform: a group generating step of generating a group to which two or more of the plurality of portable information devices belong; an identification information receiving step of receiving the identification information from a transmission source device among the plurality of portable information devices, which receives from any one of a plurality of fixed terminals each located geographically at a fixed position, identification information corresponding to related information assigned to the fixed terminal; a group determining step of, in response to receipt of the identification information from the transmission source device, determining a group to which the transmission source device belongs from among the generated groups; and a linked transmitting step of transmitting the identification information received from the transmission source device, in order to allow each of one or more portable information devices other than the transmission source device among the plurality of portable information devices which belong to the group determined, to display the related information corresponding to the identification information received from the transmission source device.

A further aspect of the present invention provides a non-transitory computer-readable recording medium encoded with an information sharing program, the information sharing program causing a computer controlling a management server capable of communicating with a plurality of portable information devices to perform the information sharing method described above.

BRIEF DESCRIPTION OF THE DRAWINGS

The above and other objects, advantages and features of the present invention will become more fully understood from the detailed description given herein below and the appended drawings which are given by way of illustration only, and thus are not intended as a definition of the limits of the present invention, and wherein:

FIG. 1 is a diagram showing an example of an entire overview of an information sharing system according to an embodiment of the present invention;

FIG. 5 is a block diagram showing an example of the functions of a CPU included in the management server according to the present embodiment;

FIG. 6 is a diagram showing an example of a user-setting group setting screen for setting a user-setting group;

FIG. 7 is a diagram showing an example of group information;

FIG. 8 is a diagram showing an example of a position-based group setting screen;

FIG. 9 is a diagram showing an example of a terminal-based group setting screen;

FIG. 10 is a diagram showing an example of a beacon terminal setting screen;

FIG. 11 is a diagram showing an example of a limited-period group setting screen;

FIG. 12 is a diagram showing an example of an update conditions setting screen;

FIG. 19 is a diagram showing an example of a start timing setting screen;

FIG. 20 is a diagram showing an example of an end timing setting screen;

FIG. 24 is a diagram showing an exemplary flow of a signal in a third embodiment;

FIG. 25 is a diagram showing an exemplary flow of a signal in a fourth embodiment; and FIG. 26 is a diagram showing an exemplary flow of a signal in a fifth embodiment.

DESCRIPTION OF THE PREFERRED EMBODIMENTS

Figure 2:
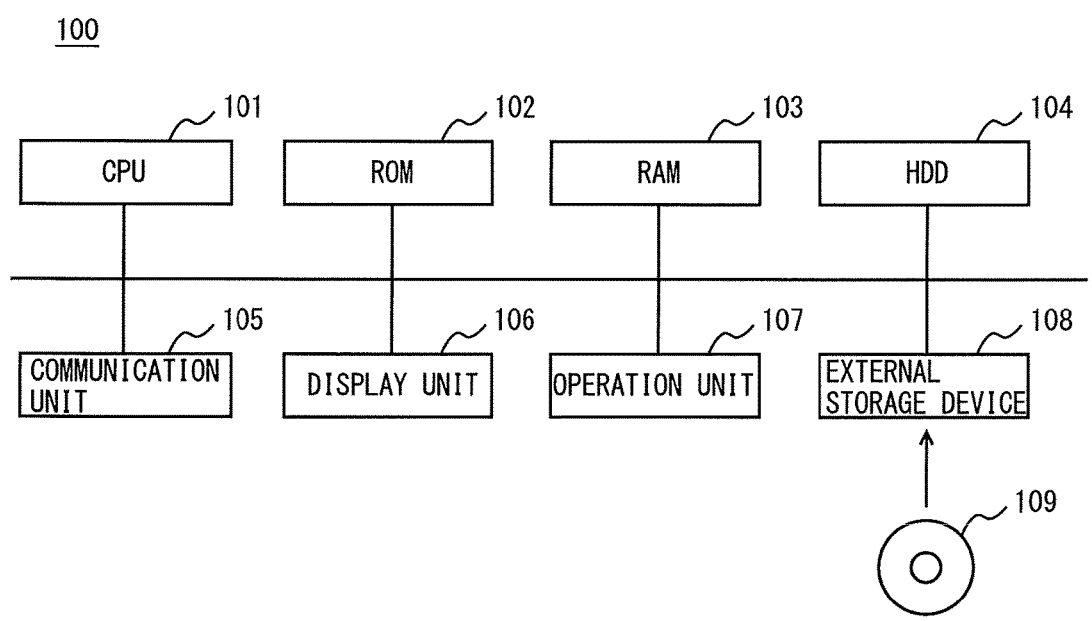
FIG. 2 is a diagram showing an example of a hardware configuration of a management server.

Hereinafter, an embodiment of the present invention will be described with reference to the drawings. However, the scope of the invention is not limited to the illustrated examples.

FIG. 1 is a diagram showing an example of an entire overview of an information sharing system according to an embodiment of the present invention. Referring to FIG. 1, an information sharing system includes smartphones 200, 200A and 200B, a management server 100, an information providing server 300, and beacon terminals 301, 301A, 301B, 301C and 301D.

Each of the smartphones 200, 200A and 200B is an example of a portable information device, which is carried by a user. Therefore, each of the smartphones 200, 200A and 200B moves together with the user. Each of the smartphones 200, 200A and 200B includes: a function of wirelessly communicating with a device in a short distance by a communication method using Bluetooth Low Energy (BLE) standards; and a function of wirelessly communicating to connect to an Internet 5. The smartphones 200, 200A and 200B have the same hardware configurations and functions, and the smartphone 200 will be taken as an example here, unless otherwise specified.

The management server 100 and the information providing server 300 are typical computers, which are connected to the Internet 5. Each of the beacon terminals 301, 301A, 301B, 301C and 301D has a function of wirelessly communicating with a device in a short distance by a communication method using BLE standards. Each of the beacon terminals 301, 301A, 301B, 301C and 301D is located geographically at a fixed position, and assigned to unique identification information, which is transmitted therefrom. The identification information may be, for example, a Universally Unique Identifier (UUID), Major Value, and Minor Value. The information providing server 300 associates related information corresponding to the identification information with the identification information. There may be the case where geographical information is set to Major Value or/and Minor Value.

In the embodiments of the present invention, it is assumed, by way of example, that each of a user A, a user B and a user C carries the smartphones 200, 200A and 200B, respectively. Further, it is here assumed, by way of example, that the beacon terminals 301, 301A, 301B, 301C and 301D are managed by an administrator, who arranges: the beacon terminal 301 at the entrance of a shop; the beacon terminal 301A in an area A within the shop; the beacon terminal 301B in an area B within the shop; the beacon terminal 301C in an area C within the shop; and the beacon terminal 301D at the exit of the shop. Further, the administrator of the shop causes the information providing server 300 to store a plurality of pieces of the related information each related to each of the beacon terminals 301, 301A, 301B, 301C and 301D, in association with each of the beacon terminals 301, 301A, 301B, 301C and 301D. Specifically, the information providing server 300 stores a related information table in which the plurality of pieces of the related information are associated with a plurality of pieces of the identification information each assigned to each of the beacon terminals 301, 301A, 301B, 301C and 301D stored in the information providing server 300. This allows the information providing server 300 to refer to the related information table to specify, from the identification information of any one of the beacon terminals 301, 301A, 301B, 301C and 301D, for example, the beacon terminal 301 here, the related information related to the beacon terminal 301.

More specifically, it is here assumed, by way of example, that: the related information related to the identification information assigned to the beacon terminal 301 is stored in the information providing server 300; the related information related to the identification information assigned to the beacon terminal 301A is stored in the information providing server 300; the related information related to the identification information assigned to the beacon terminal 301B is stored in the information providing server 300; the related information related to the identification information assigned to the beacon terminal 301C is stored in the information providing server 300; and the related information related to the identification information assigned to the beacon terminal 301D is stored in the information providing server 300. Hereinafter, the plurality of pieces of the identification information each assigned to the beacon terminals 301, 301A, 301B, 301C and 301D are referred to as identification information L, identification information LA, identification information LB, identification information LC and identification information LD, respectively, and the plurality of pieces of the related information each related to the beacon terminals 301, 301A, 301B, 301C and 301D are referred to as related information I, related information IA, related information IB, related information IC and related information ID, respectively.

Each of the beacon terminals 301, 301A, 301B, 301C and 301D transmits the identification information to a device which exists within a range of a communicable distance. For example, when a user A moves into a range of a distance where the beacon terminal 301 is able to communicate, the beacon terminal 301 transmits the identification information L to the smartphone 200. In the case where the smartphone 200 is executing a related information notification program which is a previously installed program, in response to receipt of the identification information L from the beacon terminal 301, the smartphone 200 transmits the identification information L to the information providing server 300. In the related information notification program installed in each of the smartphones 200, 200A and 200B, the information providing server 300 as an acquisition source of the related information corresponding to the identification information is set in association with the identification information.

In response to receipt of the identification information L, the information providing server 300 refers to the related information table to specify the related information I associated with the identification information L, and returns the related information I to the smartphone 200.

Therefore, in response to receipt of the identification information transmitted from the beacon terminal, each of the smartphones 200, 200A and 200B is able to acquire from the information providing server 300 the related information corresponding to the received identification information. Further, the related information stored in the information providing server 300 indicates a geographical position of the beacon terminal, each of the smartphones 200, 200A and 200B is able to acquire geographical positional information of the beacon terminal. Specifically, in response to receipt of the identification information L from the beacon terminal 301, the smartphone 200 is able to download the related information I related to the beacon terminal 301 from the information providing server 300. After downloading the related information I, the smartphone 200 notifies the user A by way of, for example, displaying the related information I. Likewise, when the user A moves into a range of a distance where the beacon terminal 301A is able to communicate, the smartphone 200 displays the related information IA; when the user A moves into a range of a distance where the beacon terminal 301B is able to communicate, the smartphone 200 displays the related information IB; when the user A moves into a range of a distance where the beacon terminal 301C is able to communicate, the smartphone 200 displays the related information IC; and when the user A moves into a range of a distance where the beacon terminal 301D is able to communicate, the smartphone 200 displays the related information ID.

It is noted here that the number of the beacon terminals 301, 301A, 301B, 301C and 301D is not limited, but may be one or more.

FIG. 2 is a diagram showing an example of a hardware configuration of a management server. Referring to FIG. 2, the management server 100 includes: a central processing unit (CPU) 101 which is responsible for overall control of the management server 100; a read only memory (ROM) 102 for storing a program to be executed by the CPU 101; a random access memory (RAM) 103 used as a work area for the CPU 101; a hard disk drive (HDD) 104 which stores data in a non-volatile manner; a communication unit 105 which connects the CPU 101 to the Internet 5; a display unit 106 which displays information; an operation unit 107 which accepts input of an operation from a user; and an external storage device 108.

The CPU 101 loads into the RAM 103, for execution, a program stored in the ROM 102 and the HDD 104. A compact disk ROM (CD-ROM) 109 which stores a program is attachable to the external storage device 108. The CPU 101 is able to access the CD-ROM 109 via the external storage device 108. The CPU 101 is able to load into the RAM 103, for execution, a program stored in the CD-ROM 109.

While the program stored in the ROM 102, the HDD 104 or the CD-ROM 109 has been described as the program executed by the CPU 101, another computer connected to the Internet 5 may rewrite the program stored in the HDD 104, or may additionally write a new program therein. Further, the management server 100 may download a program from another computer connected to the Internet 5. As used herein, the "program" includes, not only the program which the CPU 101 can execute directly, but also a source program, a compressed program, an encrypted program, and others.

It is noted that the medium for storing the program executed by the CPU 101 is not restricted to the CD-ROM 109. It may be an optical disc (a magneto-optical (MO) disc, a mini disc (MD), or a digital versatile disc (DVD)), an IC card, an optical card, or a semiconductor memory such as a mask ROM, an erasable programmable ROM (EPROM), an electrically erasable and programmable ROM (EEPROM), or the like.

Figure 3:
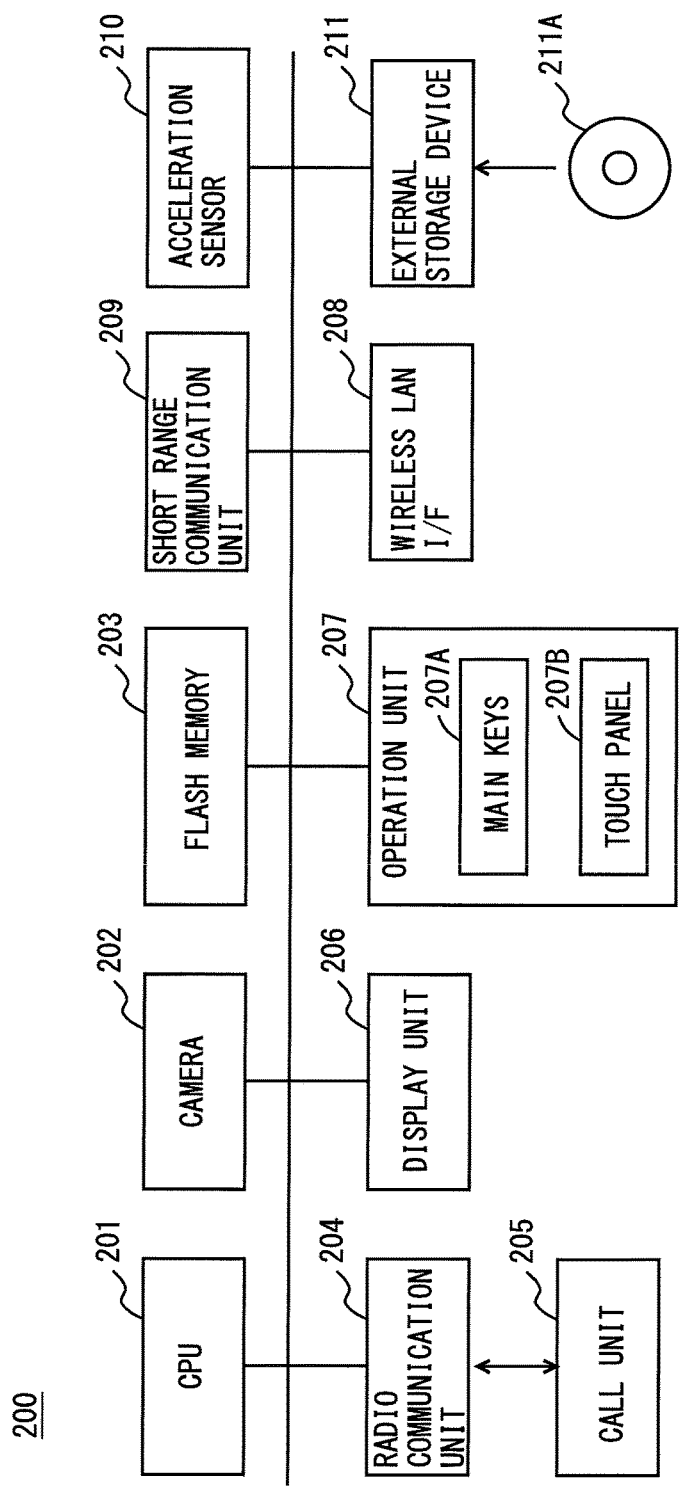
FIG. 3 is a block diagram schematically showing an overview of a hardware configuration of a smartphone according to the present embodiment.

FIG. 3 is a block diagram schematically showing an overview of a hardware configuration of a smartphone according to the present embodiment. Referring to FIG. 3, the smartphone 200 according to the present embodiment includes: a CPU 201 which is responsible for overall control of the smartphone 200; a camera 202; a flash memory 203 which stores data in a non-volatile manner; a radio communication unit 204 which is connected to a call unit 205; a display unit 206 which displays information; an operation unit 207 which accepts input of an operation from a user; a wireless LAN I/F 208; a short range communication unit 209; an acceleration sensor 210; and an external storage device 211.

The display unit 206 is a display such as a liquid crystal display (LCD) or an organic electro-luminescence display (ELD), and displays an instruction menu for the user, information about acquired image data, and others. Operation unit 207 includes main keys 207A and a touch panel 207B. When the user designates a position on a display surface of the display unit 206, the operation unit 207 outputs to the CPU 201 the position on the display surface detected by the touch panel 207B. The CPU 201 detects, based on the position detected by the touch panel 207B, a position designated by the user, within a screen displayed in the display unit 206. The CPU 201 accepts, based on the screen displayed in the display unit 206 and on the position detected by the touch panel 207B, input of various kinds of instructions from the user and data such as characters and numbers. For example, a screen including an image of numeric keys is displayed in the display unit 206, the CPU 201 accepts the number corresponding to the key displayed on the position detected by the touch panel 207B.

The camera 202 includes a lens and a photoelectric conversion element, and focuses light collected by the lens onto the photoelectric conversion element. The photoelectric conversion element performs photoelectric conversion of the received light to output image data to CPU 201. The photoelectric conversion element may be a complementary metal oxide semiconductor (CMOS) sensor, a charge coupled device (CCD) sensor, and the like.

The radio communication unit 204 communicates by radio with a mobile phone base station connected to a telephone communication network. The radio communication unit 204 connects the smartphone 200 to the telephone communication network to enable a call using the call unit 205. The radio communication unit 204 decodes a voice signal obtained by demodulating a radio signal received from the mobile phone base station and outputs the decoded signal to the call unit 205. The radio communication unit 204 encodes voice input from the call unit 205 and transmits the encoded signal to the mobile phone base station. The call unit 205 includes a microphone and a speaker. The call unit 205 outputs voice input from the radio communication unit 204 from the speaker and outputs voice input from the microphone to the radio communication unit 204. Further, the radio communication unit 204 is controlled by the CPU 201 to connect the smartphone 200 to an electronic mail server to transmit/receive an electronic mail.

The wireless LAN I/F 208 is an interface for connecting the smartphone 200 to the Internet 5. An IP address of the management server 100 is registered in the smartphone 200, and this allows the smartphone 200 to communicate with the management server 100 for data transmission/receipt.

The short range communication unit 209 uses a communication method using the BLE standards, and communicates by radio with another device, for example, any one of the beacon terminals 301, 301A, 301B, 301C and 301D. In the case where a distance from the beacon terminal 301 becomes within a range of a communicable distance, for example, the short range communication unit 209 communicates with the beacon terminal 301. The communicable distance for the short range communication unit 209 is several meters. Further, the short range communication unit 209 may communicate by a short range radio communication method using a Near Field Communication (NFC)

standards. In this case, a communicable distance for the short range communication unit 209 is several dozen centimeters.

The flash memory 203 stores a program executed by the CPU 201 or data necessary for execution of the program. The CPU 201 loads for execution the program stored in the flash memory 203 into the RAM included in the CPU 201.

The acceleration sensor 210 is a three-axis acceleration sensor to detect accelerations along an X axis, a Y axis, and a Z axis, respectively, and the acceleration sensor 210 outputs the detected accelerations to the CPU 201.

The external storage device 211 is detachably attached to the smartphone 200, and it can be mounted with a compact disc ROM (CD-ROM) 211A in which a program is stored. The CPU 201 is able to access the CD-ROM 211A via the external storage device 211. The CPU 201 can load for execution a remote operation program, which is stored in the CD-ROM 211A mounted on the external storage device 211, into the RAM included in the CPU 201.

While the program stored in the flash memory 203 or the CD-ROM 211A has been described as the program executed by the CPU 201, another computer connected to the Internet 5 may rewrite the program stored in the flash memory 203, or may additionally write a new program therein. Further, the smartphone 200 may download a program from another computer connected to the Internet 5. As used herein, the "program" includes, not only the program which the CPU 201 can execute directly, but also a source program, a compressed program, an encrypted program, and others.

Figure 4:
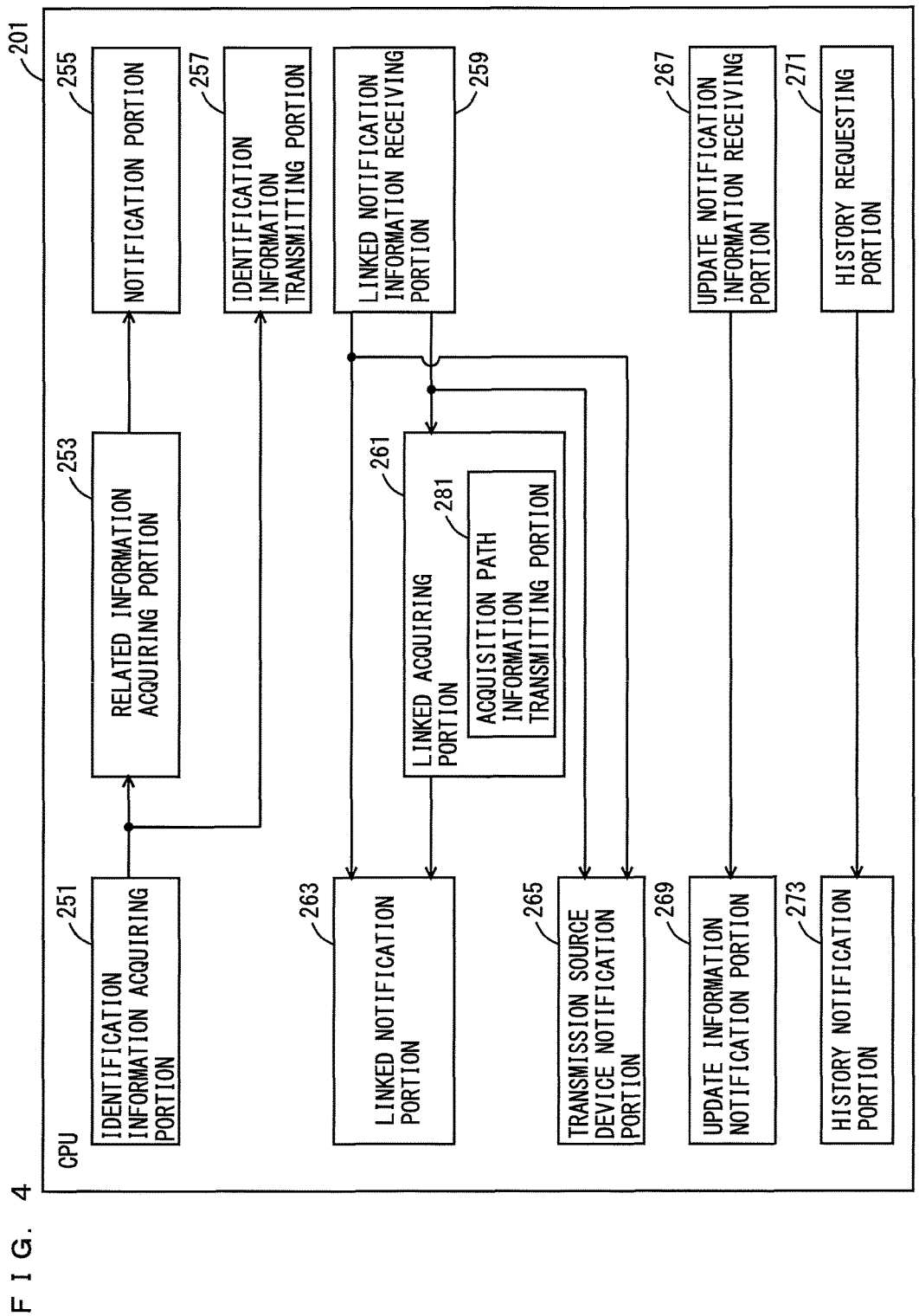
FIG. 4 is a block diagram showing an example of the functions of a CPU included in the smartphone according to the present embodiment.

FIG. 4 is a block diagram showing an example of the functions of a CPU included in the smartphone according to the present embodiment. The functions shown in FIG. 4 are formed in the CPU 201 included in the smartphone 200 as the CPU 201 executes the related information notification program stored in the ROM included in the CPU 201 or the flash memory 203. Referring to FIG. 4, the CPU 201 included in the smartphone 200 includes: an identification information acquiring portion 251; a related information acquiring portion 253; a notification portion 255; an identification information transmitting portion 257; a linked notification information receiving portion 259; a linked acquiring portion 261; a linked notification portion 263; a transmission source device notification portion 265; an update notification information receiving portion 267; an update information notification portion 269; a history requesting portion 271; and a history notification portion 273.

The identification information acquiring portion 251 controls the short range communication unit 209 to receive the identification information from a device with which the short range communication unit 209 can communicate. For example, when the user A who carries the smartphone 200 moves into a range of a predetermined distance from the beacon terminal 301, the short range communication unit 209 becomes able to communicate with the beacon terminal 301. The beacon terminal 301 transmits the identification information L to a device which is able to communicate. The identification information acquiring portion 251 outputs the identification information received by the short range communication unit 209, to the related information acquiring portion 253 and the identification information transmitting portion 257.

In response to an event that response to an event that the identification information is received from the identification information acquiring portion 251, the related information acquiring portion 253 acquires the related information corresponding to the received identification information. Hereinafter, the case where the identification information L received from the beacon terminal 301 is received from the identification information acquiring portion 251 will be described. The related information acquiring portion 253 controls the wireless LAN I/F 208 to transmit an acquisition request including the identification information L to the information providing server 300 previously determined. In response to receipt of the acquisition request including the identification information L, the information providing server 300 returns the related information I. Accordingly, the related information acquiring portion 253 acquires the related information I that the wireless LAN I/F 208 receives from the information providing server 300. Then the related information acquiring portion 253 outputs the acquired related information I to the notification portion 255.

The notification portion 255 notifies the user about the related information I received from the related information acquiring portion 253. For example, the notification portion 255 display the related information I in the display unit 206. Further, if the related information I is voice data, the notification portion 255 outputs, from the speaker included in the call unit 205, voice which is reproduced from the voice data.

In response to an event that the identification information is received from the identification information acquiring portion 251, the identification information transmitting portion 257 transmits the received identification information to the management server 100. Specifically, the identification information transmitting portion 257 controls the wireless LAN I/F 208 to transmit the identification information to the management server 100. It is preferable that a network address of the management server 100 is previously stored.

Hereinafter, functions of the management server 100 will be described. FIG. 5 is a block diagram showing an example of the functions of a CPU included in the management server according to the present embodiment. The functions shown in FIG. 5 are formed in the CPU 101 included in the management server 100 as the CPU 101 executes an information sharing program stored in the ROM 102, the HDD 104 or the CD-ROM 109. Referring to FIG. 5, the CPU 101 included in the management server 100 includes: a group generating portion 51; an identification information receiving portion 53; a history request receiving portion 55; a group determining portion 57; a proxy acquiring portion 59; a linked transmitting portion 61; a related information storing portion 63; a history transmitting portion 65; an update detecting portion 67; and an update notification information transmitting portion 69.

The identification information receiving portion 53 controls the communication unit 105 to receive the identification information from any one of the smartphones 200, 200A and 200B. In response to receipt of the identification information, the identification information receiving portion 53 specifies a transmission source device which has transmitted the identification information. The identification information receiving portion 53 outputs to the group determining portion 57, the group generating portion 51 and the proxy acquiring portion 59, a pair of the received identification information and device identification information for identifying the specified transmission source device. The device identification information for identifying the transmission source device may be, for example, a network address such as an Internet Protocol (IP) address assigned to the transmission source device. In the case where the communication unit 105 receives the identification information from the smartphone 200, for example, the identification information receiving portion 53 specifies the smartphone 200, and outputs to the group determining portion 57, the group generating portion 51 and the proxy acquiring portion 59, a pair of the received identification information and the device identification information of the smartphone 200.

The group generating portion 51 generates a group to which two or more of the smartphones 200, 200A and 200B belong. The group generating portion 51 includes: a user-setting group generating portion 71; a position-based group generating portion 73; an inquiry portion 75; a terminal-based group generating portion 77; and a limited-period group generating portion 79.

The user-setting group generating portion 71 generates a user-setting group which is set by any one of the user A, the user B and the user C who each operates the smartphones 200, 200A and 200B, respectively. For example, the user A operates the smartphone 200 to remotely operate the management server 100 from the smartphone 200, and inputs an operation of designating a group and an operation of designating two or more of the smartphones 200, 200A and 200B. This allows the user-setting group generating portion 71 to generate the user-setting group which includes two or more devices designated by the user A. Upon generating the user-setting group, the user-setting group generating portion 71 stores in the HDD 104, group information including: group identification information for identifying the generated user-setting group; and the device identification information for identifying each of two or more devices which belong to the generated user-setting group.

FIG. 6 is a diagram showing an example of a user-setting group setting screen for setting a user-setting group. Referring to FIG. 6, the user-setting group setting screen includes an item "REGISTER AUTOMATICALLY" and an item "REGISTER MANUALLY", and a checkbox of the item "REGISTER MANUALLY" is marked. An area for setting registered devices which belong to a group is provided below the item "REGISTER MANUALLY". The area for setting registered devices which belong to a group includes areas for setting the device identification information of each of devices corresponding to items "FIRST TERMINAL", "SECOND TERMINAL", "THIRD TERMINAL", "FOURTH TERMINAL", "FIFTH TERMINAL", and "SIXTH TERMINAL", respectively. It is shown here that the device name "TERMINAL A" is set as the device identification information in the area corresponding to the item "FIRST TERMINAL"; the device name "TERMINAL B" is set as the device identification information in the area corresponding to the item "SECOND TERMINAL"; and the device name "TERMINAL C" is set as the device identification information in the area corresponding to the item "THIRD TERMINAL". Further, it is assumed, by way of example, that "TERMINAL A" is the device name of the smartphone 200; "TERMINAL B" is the device name of the smartphone 200A; and "TERMINAL C" is the device name of the smartphone 200B.

FIG. 7 is a diagram showing an example of group information.

Referring to FIG. 7, the group information includes: an item of the group identification information; and an item of the device identification information. The group information shown here corresponds to the user-setting group being set in the user-setting group setting screen shown in FIG. 6. "NO. 1" is set in the item of the group identification information for identifying the user-setting group, and the device names "TERMINAL A", "TERMINAL B" and "TERMINAL C" are set in the item of the device identification information. The group information shown here allows defining that the smartphone 200 having the device name "TERMINAL A" as the device identification information, the smartphone 200A having the device name "TERMINAL B" as the device identification information, and the smartphone 200B having the device name "TERMINAL C" as the device identification information, belong to the user-setting group specified by the group identification information "NO. 1".

Returning to FIG. 5, the position-based group generating portion 73 receives from the identification information receiving portion 53, the pair of the identification information and the device identification information of the transmission source device. The position-based group generating portion 73 automatically generates a position-based group based on a device which has transmitted the identification information. The position-based group generating portion 73 generates a position-based group to which two or more portable information devices which have transmitted the same identification information within a predetermined period of time belong.

The position-based group generating portion 73 generates a position-based group in accordance with a position-based group generation rule. The position-based group generation rule may be defined by any one of the user A, the user B and the user C who operates the smartphones 200, 200A and 200B, respectively, or by the user who administers the management server 100. The position-based group generation rule includes: a generation period of time in which the identification information is received; and the maximum number of devices which can belong to the same group.

FIG. 8 is a diagram showing an example of a position-based group setting screen. Referring to FIG. 8, the position-based group setting screen includes an item "REGISTER AUTOMATICALLY" and an item "REGISTER MANUALLY", and a checkbox of the item "REGISTER AUTOMATICALLY" is marked. An area for setting the generation period of time and an area for setting the maximum number of devices are provided below the item "REGISTER AUTOMATICALLY". It is shown here that "1 minute" is set in the area for setting the generation period of time; and "5 terminals" is set in the area for setting the maximum number of devices. In this case, it is defined as the position-based group generation rule that the generation period of time is "1" minute and the maximum number of devices is "5".

Returning to FIG. 5, there may be the case where two or more pairs having the same identification information exist among a plurality of pairs of the identification information and the device identification information of the transmission source device received from the identification information receiving portion 53 within the generation period of time determined by the position-based group generation rule. In this case, the position-based group generating portion 73 determines as a candidate device, each of two or more devices specified by each of two or more pieces of the device identification information included in each of two or more pairs having the same identification information. The position-based group generating portion 73 outputs to the inquiry portion 75, a first inquiry instruction including the device identification information of each of two or more candidate devices.

In response to an event that the first inquiry instruction is received, the inquiry portion 75 makes an inquiry to each of two or more candidate devices specified by the first inquiry instruction, about whether to agree to be grouped. The inquiry portion 75 outputs to the position-based group generating portion 73, the device identification information of the candidate device, among two or more candidate devices, which has responded with agreement to be grouped.

The position-based group generating portion 73 generates the position-based group to which two or more candidate devices which have responded with agreement to be grouped, on the condition that the device identification information of two or more candidate devices is input from the inquiry portion 75 after the first inquiry instruction has been output. Upon generating the position-based group, the position-based group generating portion 73 stores in the HDD 104, the group information including: the group identification information for identifying the generated position-based group; and the device identification information for identifying each of two or more devices which belong to the generated position-based group.

For example, the user A operates the smartphone 200 to remotely operate the management server 100 from the smartphone 200, so as to set "1" minute to the generation period of time and "2" to the maximum number of terminals. Accordingly, the position-based group generation rule is defined. After that, in the case where the user A, the user B and the user C pass through the entrance of a shop at the same time, each of the smartphone 200 carried by the user A, the smartphone 200A carried by the user B and the smartphone 200B carried by the user C receives the identification information L from the beacon terminal 301. Then, each of the smartphones 200, 200A and 200B transmits the same identification information L to the management server 100. In this case, the position-based group generating portion 73 determines the smartphones 200, 200A and 200B as the candidate devices. As a result of the inquiry made by the inquiry portion 75, if the user A and the user B who respectively operate the smartphones 200 and 200A respond with agreement to to be grouped, the position-based group generating portion 73 generates the position-based group to which the smartphones 200 and 200A belong. The position-based group generating portion 73 stores in the HDD 104, the group information including: the group identification information for identifying the generated position-based group; and the device identification information of each of the smartphones 200 and 200A.

The terminal-based group generating portion 77 receives from the identification information receiving portion 53, a pair of the identification information and the device identification information of the transmission source device. The terminal-based group generating portion 77 automatically generates a terminal-based group based on a device which has transmitted a first piece of the identification information previously determined. After generation of the terminal-based group, the terminal-based group generating portion 77, based on a device which has transmitted a second piece of the identification information previously determined, deletes the terminal-based group. The terminal-based group generating portion 77 generates the terminal-based group to which two or more portable information devices, which have transmitted the first piece of the identification information within a predetermined period of time, belong.

The terminal-based group generating portion 77 generates the terminal-based group in accordance with a terminal-based group generation rule. The terminal-based group generation rule may be defined by any one of the user A, the user B and the user C who operates the smartphones 200, 200A and 200B, respectively, or by the user who administers the management server 100. The terminal-based group generation rule includes: a generation period of time in which the identification information is received; a starting point terminal; an end point terminal; and the maximum number of devices which can belong to the same group. The starting point terminal and the end point terminal may respectively be any one of the beacon terminals 301, 301A, 301B, 301C and 301D.

FIG. 9 is a diagram showing an example of a terminal-based group setting screen. Referring to FIG. 9, the terminal-based group setting screen includes: an area for setting a generation period of time; an area for setting the maximum number of devices; an area for setting the starting point terminal; and an area for setting the end point terminal. It is shown here that "1 minute" is set in the area for setting the generation period of time; "5 terminals" is set in the area for setting the maximum number of devices; the device identification information "BEACON A" is set in the area for setting the starting point terminal; and the device identification information "BEACON D" is set in the area for setting the end point terminal. It is assumed here that the device identification information of the beacon terminal 301 is "BEACON A"; and the device identification information of the beacon terminal 301C is "BEACON D". In this case, it is defined as the terminal-based group generation rule that the generation period of time is "1" minute; the maximum number of devices is "5"; the starting point terminal is the beacon terminal 301; and the end point terminal is the beacon terminal 301C.

Further, the terminal-based group setting screen includes beacon terminal setting buttons with the characters "SET BEACON TERMINAL" displayed thereon, which are respectively provided below each of the area for setting the starting point terminal and the area for setting the end point terminal. If the beacon terminal setting button is designated, a beacon terminal setting screen will be displayed.

FIG. 10 is a diagram showing an example of a beacon terminal setting screen. Referring to FIG. 10, the beacon terminal setting screen includes: an area for displaying a list of the beacon terminals; a button with the characters "EXECUTE BEACON TERMINAL SETTING" displayed thereon; a button with the characters "VIEW RELATED INFORMATION" displayed thereon; and a button with the characters "REFER TO LIST INCLUDED IN ANOTHER MOBILE TERMINAL" displayed thereon. The area for displaying the list of the beacon terminals includes: an item of selection; an item of the number; an item of the beacon terminal; an item of an information sender; and an item of the received date and time. The name of the beacon terminal is set in the item of the beacon terminal. The name of an administrator of the beacon terminal is set in the item of the information sender. The date and time when the identification information is received from the beacon terminal is set in the item of the received date and time. In the case where the beacon terminal setting screen is displayed in the smartphone 200, for example, the smartphone 200 stored the information regarding the beacon terminal at the point of time in the past when the smartphone 200 received the identification information from the beacon terminal, and based on the stored information regarding the beacon terminal, the name of the beacon terminal, the name of the administrator of the beacon terminal, and the date and time when the identification information was received from the beacon terminal are displayed in the beacon terminal setting screen.

In the state where a checkbox of the item of selection is marked, when the button with the characters "EXECUTE BEACON TERMINAL SETTING" displayed thereon is designated, the beacon terminal having the name with the checkbox of the item of selection marked is set. In the case where the beacon setting screen is displayed after the button "SET BEACON TERMINAL" below the area for setting the starting point terminal is designated in the terminal-based group setting screen shown in FIG. 9, the beacon terminal having the name with the checkbox of the item of selection marked is set as the starting point terminal; whereas in the case where the beacon setting screen is displayed after the button "SET BEACON TERMINAL" below the area for setting the end point terminal is designated in the terminal-based group setting screen shown in FIG. 9, the beacon terminal having the name with the checkbox of the item of selection marked is set as the end point terminal.

In the case where the button with the characters "VIEW RELATED INFORMATION" displayed thereon is designated, the identification information received in the past from the beacon terminal having the name with the checkbox of the item of selection marked is used, the related information stored in a position specified by the identification information is acquired, and the acquired related information is displayed in a pop-up window.

In the case where the button with the characters "REFER TO LIST INCLUDED IN ANOTHER MOBILE TERMINAL" displayed thereon is designated, the information regarding the beacon terminal is acquired from another device, and then the area for displaying the list of the beacon terminals is updated by a list generated based on the acquired information regarding the beacon terminal.

Returning to FIG. 5, there may be the case where two or more pairs having the identification information associated with the starting point terminal determined by the terminal-based group generation rule exist among a plurality of pairs of the identification information and the device identification information of the transmission source device received from the identification information receiving portion 53 within the generation period of time determined by the terminal-based group generation rule. In this case, the terminal-based group generating portion 77 determines as a candidate device, each of two or more devices specified by each of two or more pieces of the device identification information included in each of two or more pairs having the identification information associated with the starting point terminal. The terminal-based group generating portion 77 outputs to the inquiry portion 75, a second inquiry instruction including the device identification information of each of two or more candidate devices.

In response to an event that the second inquiry instruction is received, the inquiry portion 75 makes an inquiry to each of two or more candidate devices specified by the second inquiry instruction, about whether to agree to be grouped. The inquiry portion 75 outputs to the terminal-based group generating portion 77, the device identification information of the candidate device, among two or more candidate devices, which has responded with agreement to be grouped.

The terminal-based group generating portion 77 generates the terminal-based group to which two or more candidate devices which have responded with agreement to be grouped, on the condition that the device identification information of two or more candidate devices is input from the inquiry portion 75 after the second inquiry instruction has been output. Upon generating the terminal-based group, the terminal-based group generating portion 77 stores in the HDD 104, the group information including: the group identification information for identifying the generated terminal-based group; and the device identification information for identifying each of two or more devices which belong to the generated terminal-based group.

There may be the case where after generation of the terminal-based group, a pair including: the same device identification information as the device identification information of any one of two or more devices included in the terminal-based group; and the identification information associated with the end point terminal determined by the terminal-based group generation rule, exists among a plurality of pairs of the identification information and the device identification information of the transmission source device received from the identification information receiving portion 53. In this case, the terminal-based group generating portion 77 deletes the terminal-based group. Upon deleting of the terminal-based group, the terminal-based group generating portion 77 stores as group history information, the group information specified by the group identification information of the terminal-based group, among a plurality of pieces of the group information stored in HDD 104. Then, the terminal-based group generating portion 77 deletes the group information.

For example, the user A operates the smartphone 200 to remotely operate the management server 100 from the smartphone 200, so as to set: "1" minute to the generation period of time; the beacon terminal 301 provided at the entrance of a shop to the starting point terminal; the beacon terminal 301D provided at the exit of the shop to the end point terminal; and "2" to the maximum number of terminals. Accordingly, the terminal-based group generation rule is defined. After that, in the case where the user A, the user B and the user C pass through the entrance of a shop at the same time, each of the smartphone 200 carried by the user A, the smartphone 200A carried by the user B and the smartphone 200B carried by the user C receives the identification information L from the beacon terminal 301. Then, each of the smartphones 200, 200A and 200B transmits the same identification information L to the management server 100. In this case, the terminal-based group generating portion 77 determines the smartphones 200, 200A and 200B as the candidate devices. As a result of the inquiry made by the inquiry portion 75, if the user A and the user B who respectively operate the smartphones 200 and 200A respond with agreement to be grouped, the terminal-based group generating portion 77 generates the terminal-based group to which the smartphones 200 and 200A belong. The terminal-based group generating portion 77 stores in the HDD 104, the group information including: the group identification information for identifying the generated terminal-based group; and the device identification information of each of the smartphones 200 and 200A.

Further, in the case where either the user A or the user B, for example, the user A passes through the exit of a shop, the smartphone 200 carried by the user A receives the identification information LD from the beacon terminal 301D, and then transmits the received identification information LD to the management server 100. In this case, the terminal-based group generating portion 77 deletes the terminal-based group including the device identification information of the smartphone 200. The terminal-based group generating portion 77 stores as the group history information, the group information of the terminal-based group including the device identification information of the smartphone 200, among a plurality of pieces of the group information stored in HDD 104. Then, the terminal-based group generating portion 77 deletes the group information.

The limited-period group generating portion 79 receives from the identification information receiving portion 53, a pair of the identification information and the device identification information of the transmission source device. In response to receipt of a first piece of the identification information from any one of a plurality of registered devices previously determined, the limited-period group generating portion 79 automatically generates a limited-period group, and after generation of the limited-period group, in response to receipt of a second piece of the identification information from any one of a plurality of registered devices previously determined, the limited-period group generating portion 79 deletes the limited-period group. The limited-period group generating portion 79 generates the limited-period group to which the plurality of registered devices belong.

The limited-period group generating portion 79 generates the limited-period group in accordance with a limited-period group generation rule. The limited-period group generation rule may be defined by any one of the user A, the user B and the user C who operates the smartphones 200, 200A and 200B, respectively, or by the user who administers the management server 100. The limited-period group generation rule includes the plurality of registered devices, the starting point terminal and the end point terminal. The registered device may be any one of the smartphones 200, 200A and 200B. The starting point terminal and the end point terminal may respectively be any one of the beacon terminals 301, 301A, 301B, 301C and 301D.

FIG. 11 is a diagram showing an example of a limited-period group setting screen. Referring to FIG. 11, the limited-period group setting screen includes: an area for setting registered devices; an area for setting the starting point terminal; and an area for setting the end point terminal. The area for setting registered devices includes areas for setting the device identification information of each of devices corresponding to items "FIRST TERMINAL", "SECOND TERMINAL", "THIRD TERMINAL", "FOURTH TERMINAL", "FIFTH TERMINAL", and "SIXTH TERMINAL", respectively. It is shown here that the device name "TERMINAL A" is set as the device identification information in the area corresponding to the item "FIRST TERMINAL"; the device name "TERMINAL B" is set as the device identification information in the area corresponding to the item "SECOND TERMINAL"; and the device name "TERMINAL C" is set as the device identification information in the area corresponding to the item "THIRD TERMINAL". Further, it is assumed, by way of example, that "TERMINAL A" is the device name of the smartphone 200; "TERMINAL B" is the device name of the smartphone 200A; and "TERMINAL C" is the device name of the smartphone 200B.

It is shown here that the device identification information "BEACON A" is set in the area for setting the starting point terminal; and the device identification information "BEACON D" is set in the area for setting the end point terminal. It is assumed here that the device identification information of the beacon terminal 301 is "BEACON A"; and the device identification information of the beacon terminal 301C is "BEACON D". In this case, it is defined as the limited-period group generation rule that the registered devices are the smartphones 200, 200A and 200B; the starting point terminal is the beacon terminal 301; and the end point terminal is the beacon terminal 301C.

Further, the limited-period group setting screen includes beacon terminal setting buttons with the characters "SET BEACON TERMINAL" displayed thereon, which are respectively provided below each of the area for setting the starting point terminal and the area for setting the end point terminal. If any one of the beacon terminal setting buttons is designated, a beacon terminal setting screen as shown in FIG. 10 will be displayed.

The limited-period group generating portion 79 generates the limited-period group to which a plurality of registered devices belong, in response to an event that a pair of the device identification information of any one of a plurality of the registered devices determined by the limited-period group generation rule and the identification information associated with the starting point terminal determined by the limited-period group generation rule is input from the identification information receiving portion 53. Upon generating the limited-period group, the limited-period group generating portion 79 stores in the HDD 104, the group information including: the group identification information for identifying the generated limited-period group; and the device identification information for identifying each of the plurality of the registered devices which belong to the generated limited-period group.

After generation of the limited-period group, the limited-period group generating portion 79 deletes the limited-period group, in response to an event that a pair of the device identification information of any one of a plurality of devices which belong to the limited-period group and the identification information associated with the end point terminal determined by the limited-period group generation rule is input from the identification information receiving portion 53. Upon deleting the limited-period group, the limited-period group generating portion 79 stores as the group history information, the group information specified by the group identification information of the limited-period group, among a plurality of pieces of the group information stored in HDD 104. Then, the limited-period group generating portion 79 deletes the group information.

For example, the user A operates the smartphone 200 to remotely operate the management server 100 from the smartphone 200, so as to set; each of the smartphones 200, 200A and 200B to the registered device; the beacon terminal 301 provided at the entrance of a shop to the starting point terminal; and the beacon terminal 301D provided at the exit of the shop to the end point terminal. Accordingly, the limited-period group generation rule is defined. After that, in the case where any one of the user A, the user B and the user C, for example, the user A passes through the entrance of a shop, the smartphone 200 carried by the user A receives the identification information L from the beacon terminal 301. Then, the smartphone 200 transmits the identification information L to the management server 100. In this case, the limited-period group generating portion 79 generates the limited-period group to which the smartphones 200, 200A and 200B belong. The limited-period group generating portion 79 stores in the HDD 104, the group information including: the group identification information for identifying the generated limited-period group; and the device identification information of each of the smartphones 200, 200A and 200B.

Further, in the case where any one of the user A, the user B and the user C, for example, the user A passes through the exit of a shop, the smartphone 200 carried by the user A receives the identification information LD from the beacon terminal 301D, and then transmits the received identification information LD to the management server 100. In this case, the limited-period group generating portion 79 deletes the limited-period group including the device identification information of the smartphone 200. The limited-period group generating portion 79 stores as the group history information, the group information of the limited-period group including the device identification information of the smartphone 200, among a plurality of pieces of the group information stored in HDD 104. Then, the limited-period group generating portion 79 deletes the group information.

In response to an event that a pair of the identification information and the device identification information of the transmission source device is input from the identification information receiving portion 53, the group determining portion 57 determines a group to which the transmission source device belongs among a plurality of groups generated by the group generating portion 51. The plurality of groups generated by the group generating portion 51 include the user-setting group, the position-based group, the terminal-based group and the limited-period group. Specifically, the group determining portion 57 extracts from a plurality of pieces of the group information stored in the HDD 104, the group information including the device identification information of the transmission source device input from the identification information receiving portion 53. Upon extracting the group information including the same device identification information as the device identification information of the transmission source device input from the identification information receiving portion 53, the group determining portion 57 outputs the group identification information of the extracted group information to the related information storing portion 63, and outputs to the linked transmitting portion 61, the group identification information of the extracted group information as well as the device identification information of the transmission source device.

In response to an event that a pair of the identification information and the device identification information of the transmission source device is input from the identification information receiving portion 53, the proxy acquiring portion 59 acquires the related information corresponding to the identification information. The proxy acquiring portion 59 outputs a pair of the acquired related information and the identification information to the related information storing portion 63 and the linked transmitting portion 61. It is here assumed, by way of example, that the device identification information of the smartphone 200 as the transmission source device and the identification information L assigned to the beacon terminal 301 are input from the identification information acquiring portion 251. The identification information L is associated with the related information I by the information providing server 300. The proxy acquiring portion 59 controls the communication unit 105 to transmit the acquisition request including the identification information L to the information providing server 300. In response to receipt of the acquisition request including the identification information L, the information providing server 300 returns the related information I, and the proxy acquiring portion 59 accordingly acquires the related information I that the communication unit 105 receives from the information providing server 300. The proxy acquiring portion 59 outputs a pair of the acquired related information I and the identification information L to the related information storing portion 63 and the linked transmitting portion 61.

There may be the case where the information providing server 300 prohibits duplicating the related information acquired by the proxy acquiring portion 59. In this case, the information providing server 300 transmits the related information and a duplicate prohibition signal indicating prohibition of duplicating the related information. Further, there may be the case where the information providing server 300 restricts acquisition of the related information acquired by the proxy acquiring portion 59 only to a device which is located within the range of a predetermined distance from the beacon terminal. In this case, the information providing server 300 transmits the related information and a distance restriction signal indicating restriction of distance. The proxy acquiring portion 59 detects prohibition of duplicating and forwarding the related information, respectively from the duplicate prohibition signal and the distance restriction signal received with the related information from the information providing server 300.

In the case where it is prohibited to duplicate the acquired related information, the proxy acquiring portion 59 outputs to the linked transmitting portion 61, in addition to the pair of the related information and the identification information, a signal of prohibition of duplicating the related information. Further, in the case where acquisition of the related information is restricted only to the device which is located within the range of a predetermined distance from the beacon terminal, the proxy acquiring portion 59 outputs to the linked transmitting portion 61, in addition to the pair of the related information and the identification information, a signal of restricting acquisition of the related information.

The linked transmitting portion 61 receives from the group determining portion 57, the group identification information and the device identification information of the transmission source device. In response to receipt of the pair of the related information and the identification information from the proxy acquiring portion 59, the linked transmitting portion 61 outputs linked notification information to all devices other than the transmission source device among devices which belong to a group specified by the group identification information input from the group determining portion 57. The linked notification information includes: the identification information input from the proxy acquiring portion 59; and the device identification information of the transmission source device input from the group determining portion 57. Specifically, the linked transmitting portion 61 determines, among a plurality of pieces of the group information stored in the HDD 104, the group information including the group identification information input from the group determining portion 57, and determines as a transmission target, all devices excluding the transmission source device, among devices having the device identification information included in the determined group information. The linked transmitting portion 61 controls the communication unit 105 to transmit the linked notification information to all of the devices determined as the transmission targets.

The linked transmitting portion 61 includes a proxy information generating portion 81 and a distance restriction information generating portion 83. In the case where the signal of prohibition of duplicating is input from the proxy acquiring portion 59, the proxy information generating portion 81 generates proxy information on the basis of the identification information and the device identification information of the transmission source device. In the case where the proxy information is generated by the proxy information generating portion 81, the linked transmitting portion 61 controls the communication unit 105 to transmit the linked notification information including the proxy information in place of the identification information to all of the devices determined as transmission targets.

The proxy information generating portion 81 accesses the information providing server 300 on the basis of the identification information, and acquires information related to the identification information. The proxy information generating portion 81 generates the proxy information including: the name of the transmission source device or the name of the user assigned to the transmission source device; and information related to the beacon terminal. For example, in the case of acquiring as the information related to the identification information, the name of a shop where the beacon terminal is provided, the proxy information generating portion 81 generates as the proxy information, a message including: the name of the transmission source device or/and the name of the user assigned to the transmission source device; and the name of the shop. The message may be, for example, "The terminal A exists in the shop X".

In the case where the signal of restricting acquisition of the related information is input from the proxy acquiring portion 59, the distance restriction information generating portion 83 adds to the linked notification information, distance restriction information indicating restriction of acquisition of the related information. In the case where the distance restriction information is added to the linked notification information by the distance restriction information generating portion 83, the linked transmitting portion 61 controls the communication unit 105 to transmit the linked notification information with the distance restriction information added, to all of the devices determined as transmission targets.

The related information storing portion 63 receives a pair of the related information and the identification information from the proxy acquiring portion 59, and receives the group identification information from the group determining portion 57. The related information storing portion 63 stores the related information in association with the identification information, the group identification information and the present date and time. Specifically, the related information storing portion 63 stores in the HDD 104, a set of the related information, the identification information, the group identification information and the present date and time.

The update detecting portion 67 detects update of the related information stored by the related information storing portion 63. The update detecting portion 67 detects that the related information is updated in accordance with update conditions previously determined. The update conditions may be set by the user who administers the management server 100 or any one of the users who operate a plurality of the registered devices belonging to each of a plurality of groups.

FIG. 12 is a diagram showing an example of an update conditions setting screen. Referring to FIG. 12, the update conditions setting screen includes an area for setting confirmation frequency and an area for setting confirmation period. The confirmation frequency indicates frequency of detecting that the related information has been updated. It is shown here that "ONCE EVERY (7) DAYS" is set as the confirmation frequency. The confirmation period is a period set for restricting pieces of the related information to be confirmed as updated or not. It is determined whether the update has been performed or not on the related information received during a period long as of the confirmation period prior to the present date and time.

At a point of time determined by the confirmation frequency, the update detecting portion 67 sequentially sets as a process target, each of a plurality of sets existing within the confirmation period, among the sets of the related information, the identification information, the group identification information and the present date and time stored in the HDD 104. The update detecting portion 67 acquires the related information stored in a position specified by the identification information included in the set as the process target, and compares the acquired related information with the related information included in the set as the process target. The update detecting portion 67 uses the related information corresponding to the identification information included in the set as the process target, to acquire from the information providing server 300. In the case where the acquired related information is different from the related information included in the set as the process target, the update detecting portion 67 determines that the related information included in the set as the process target stored in the HDD 104 has been updated. Upon detecting that the related information has been updated, the update detecting portion 67 outputs to the update notification information transmitting portion 69, an update notification instruction including the identification information and group identification information of the updated related information.

In response to an event that the update notification instruction is input from the update detecting portion 67, the update notification information transmitting portion 69 transmits the update notification information to all devices which belong to the group specified by the group identification information included in the update notification instruction. The update notification information includes the identification information included in the update notification instruction, and indicates that the related information stored in the position specified by the identification information has been updated. Specifically, the update notification information transmitting portion 69 refers to the group information and group history information stored in the HDD 104, and acquires the device identification information of all devices which belong to the group specified by the group identification information included in the update notification instruction. The group information of the terminal-based group and limited-period group is stored in the HDD 104 as the group history information in the case of being deleted from the HDD 104. The update notification information transmitting portion 69 controls the communication unit 105 to transmit the update notification information including the identification information included in the update notification instruction, to the device specified by the acquired device identification information.

The history request receiving portion 55 controls the communication unit 105 to receive a history request from any one of the smartphones 200, 200A and 200B. In response to receipt of the history request, the history request receiving portion 55 specifies a device which has transmitted the history request, refers to the group information and group history information stored in the HDD 104, and specifies a group to which the specified device belongs. The history request receiving portion 55 outputs to the history transmitting portion 65, a history transmission instruction including the group identification information of the specified group as well as the device identification information of the device which has transmitted the history request.

In response to an event that the history transmission instruction is input, the history transmitting portion 65 transmits to the device which has transmitted the history request, the related information transmitted in the past to the device which has transmitted the history request, among a plurality of pieces of the related information stored by the related information storing portion 63. Specifically, the related information is stored in the HDD 104 in association with the group identification information, and therefore the history transmitting portion 65 reads from the HDD 104 the related information associated with the group identification information included in the history transmission instruction, and controls the communication unit 105 to transmit the read related information to the device specified by the device identification information included in the history transmission instruction.

Returning to FIG. 4, in response to an event that the wireless LAN I/F 208 receives the linked notification information from the management server 100, the linked notification information receiving portion 259 acquires the linked notification information. There may be the cases: where the linked notification information includes the identification information and the device identification information of the transmission source device; and where the linked notification information includes the proxy information and the device identification information of the transmission source device. Further, if the linked notification information includes the identification information and the device identification information of the transmission source device, there may be the cases: where the linked notification information includes the distance restriction information; and where the linked notification information does not include the distance restriction information. In the case where the linked notification information received from the management server 100 includes the identification information, the linked notification information receiving portion 259 outputs the identification information included in the linked notification information to the linked acquiring portion 261, and outputs the device identification information of the transmission source device to the transmission source device notification portion 265.

In the case where the linked notification information received from the management server 100 includes the proxy information, the linked notification information receiving portion 259 outputs the proxy information to the linked notification portion 263, and outputs the device identification information of the transmission source device to the transmission source device notification portion 265. In the case where the smartphone 200 belongs to the same user-setting group as the smartphone 200A, for example, the identification information L associated with the beacon terminal 301 is transmitted to the management server 100 at the point of time when the smartphone 200A passes in the vicinity of the beacon terminal 301. In the case where it is not prohibited to duplicate the related information I corresponding to the identification information L, the management server 100 regards the smartphone 200A as the transmission source device, and transmits to the smartphone 200 which belongs to the same user-setting group as the smartphone 200A, the device identification information of the smartphone 200A and the linked notification information including the identification information L. In response to receipt of the linked notification information from the management server 100, the linked notification information receiving portion 259 included in the smartphone 200 outputs the identification information L included in the linked notification information to the linked acquiring portion 261, and outputs the device identification information of the smartphone 200A to the transmission source device notification portion 265.

Further, in the case where it is prohibited to duplicate the related information I stored in the position specified by the identification information L, the management server 100 regards the smartphone 200A as the transmission source device, and transmits to the smartphone 200 which belongs to the same user-setting group as the smartphone 200A, the device identification information of the smartphone 200A and the linked notification information including the proxy information. In response to receipt of the linked notification information from the management server 100, the linked notification information receiving portion 259 included in the smartphone 200 outputs the proxy information included in the linked notification information to the linked notification portion 263, and outputs the device identification information of the smartphone 200A to the transmission source device notification portion 265.

Further, in the case where acquisition of the related information I stored in the position specified by the identification information L is subject to the distance restriction, the management server 100 regards the smartphone 200A as the transmission source device, and transmits to the smartphone 200 which belongs to the same user-setting group as the smartphone 200A, the device identification information of the smartphone 200A, the identification information L and the linked notification information including the distance restriction information. In response to receipt of the linked notification information including the distance restriction information from the management server 100, the linked notification information receiving portion 259 included in the smartphone 200 outputs the identification information L and the distance restriction information included in the linked notification information to the linked acquiring portion 261, and outputs the device identification information of the smartphone 200A to the transmission source device notification portion 265.

There may be the cases; where the linked acquiring portion 261 only receives the identification information from the linked notification information receiving portion 259; and where the linked acquiring portion 261 receives the identification information and the distance restriction information. In the case of only receiving the identification information from the linked notification information receiving portion 259, the linked acquiring portion 261 acquires from the information providing server 300, the related information corresponding to the identification information. It is here assumed, by way of example, that the identification information L is input from the linked notification information receiving portion 259. The linked acquiring portion 261 controls the wireless LAN I/F 208 to transmit the acquisition request including the identification information L to the information providing server 300. In response to receipt of the acquisition request including the identification information L, the information providing server 300 returns the related information I. Accordingly, the linked acquiring portion 261 acquires the related information I that the wireless LAN I/F 208 receives from the information providing server 300, and outputs the acquired related information I to the linked notification portion 263.

In the case where the identification information and the distance restriction information are input from the linked notification information receiving portion 259, the linked acquiring portion 261 acquires the related information corresponding to the identification information. The linked acquiring portion 261 controls the wireless LAN I/F 208 to transmit to the information providing server 300, the acquisition request including the identification information and acquisition path information indicating that an acquisition path of the identification information is not regular. In response to receipt of the acquisition request including the identification information and the acquisition path information indicating that the acquisition path of the identification information is not regular, there may be the cases: where the information providing server 300 returns the related information; and where the information providing server 300 returns error information. In the case where the wireless LAN I/F 208 receives the related information from the information providing server 300, the linked acquiring portion 261 outputs the received related information to the linked notification portion 263, whereas in the case where the wireless LAN I/F 208 receives the error information from the information providing server 300, the linked acquiring portion 261 outputs nothing to the linked notification portion 263.

In response to an event that the related information is input from the linked acquiring portion 261, the linked notification portion 263 notifies the user about the related information. For example, the linked notification portion 263 displays the related information in the display unit 206. Further, in the case where the related information is voice data, the linked notification portion 263 controls the speaker included in the call unit 205 to output voice which is reproduced from the voice data.

Further, in response to an event that the proxy information is input from the linked notification information receiving portion 259, the linked notification portion 263 notifies the user about the proxy information. For example, the linked notification portion 263 displays the proxy information in the display unit 206. Further, in the case where the proxy information is voice data, the linked notification portion 263 controls the speaker included in the call unit 205 to output voice which is reproduced from the voice data.

In response to an event that the device identification information of the transmission source device is input from the linked notification information receiving portion 259, the transmission source device notification portion 265 notifies the user about the transmission source device. For example, the transmission source device notification portion 265 displays the device identification information of the transmission source device in the display unit 206. Preferably, the transmission source device notification portion 265 displays in the display unit 206, the device identification information of the transmission source device in association with the related information or the proxy information displayed in the display unit 206 by the linked notification portion 263. For example, the transmission source device notification portion 265 displays the device identification information of the transmission source device in parallel with the related information or the proxy information.

There may be the case where the wireless LAN I/F 208 receives the update notification information from the management server 100. In the case where the wireless LAN I/F 208 receives the update notification information from the management server 100, the update notification information receiving portion 267 acquires from the information providing server 300, the related information corresponding to the identification information included in the received update notification information, and outputs the acquired related information to the update information notification portion 269. In response to an event that the related information is input from the update notification information receiving portion 267, the update information notification portion 269 notifies the user that the related information has been updated. The update information notification portion 269 displays in the display unit 206, for example, the related information and a message indicating that the related information has been updated. Further, in the case where the related information is voice data, the linked notification portion 263 controls the speaker included in the call unit 205 to output voice which is reproduced from the message indicating that the related information has been updated, and then output voice which is reproduced from the voice data of the related information. This allows the user who operates the smartphone 200 to know that the related information as viewed in the past has been updated, and to obtain the updated related information.

In the case where the user inputs to the operation unit 207, an operation of requesting view of the history, the history requesting portion 271 accepts a request of viewing history. In response to acceptance of the request of viewing history, the history requesting portion 271 controls the wireless LAN I/F 208 to transmit a history request to the management server 100. The management server 100 receiving the history request then returns the related information which has been transmitted to the smartphone 200 in the past. Accordingly, the wireless LAN I/F 208 outputs to the history notification portion 273, the related information received from the management server 100.

The history notification portion 273 notifies the user about the related information input from the history requesting portion 271. Specifically, the history notification portion 273 displays the related information in the display unit 206. Further, in the case where the related information is voice data, the history notification portion 273 controls the speaker included in the call unit 205 to output voice which is reproduced from the voice data.

Figure 13:
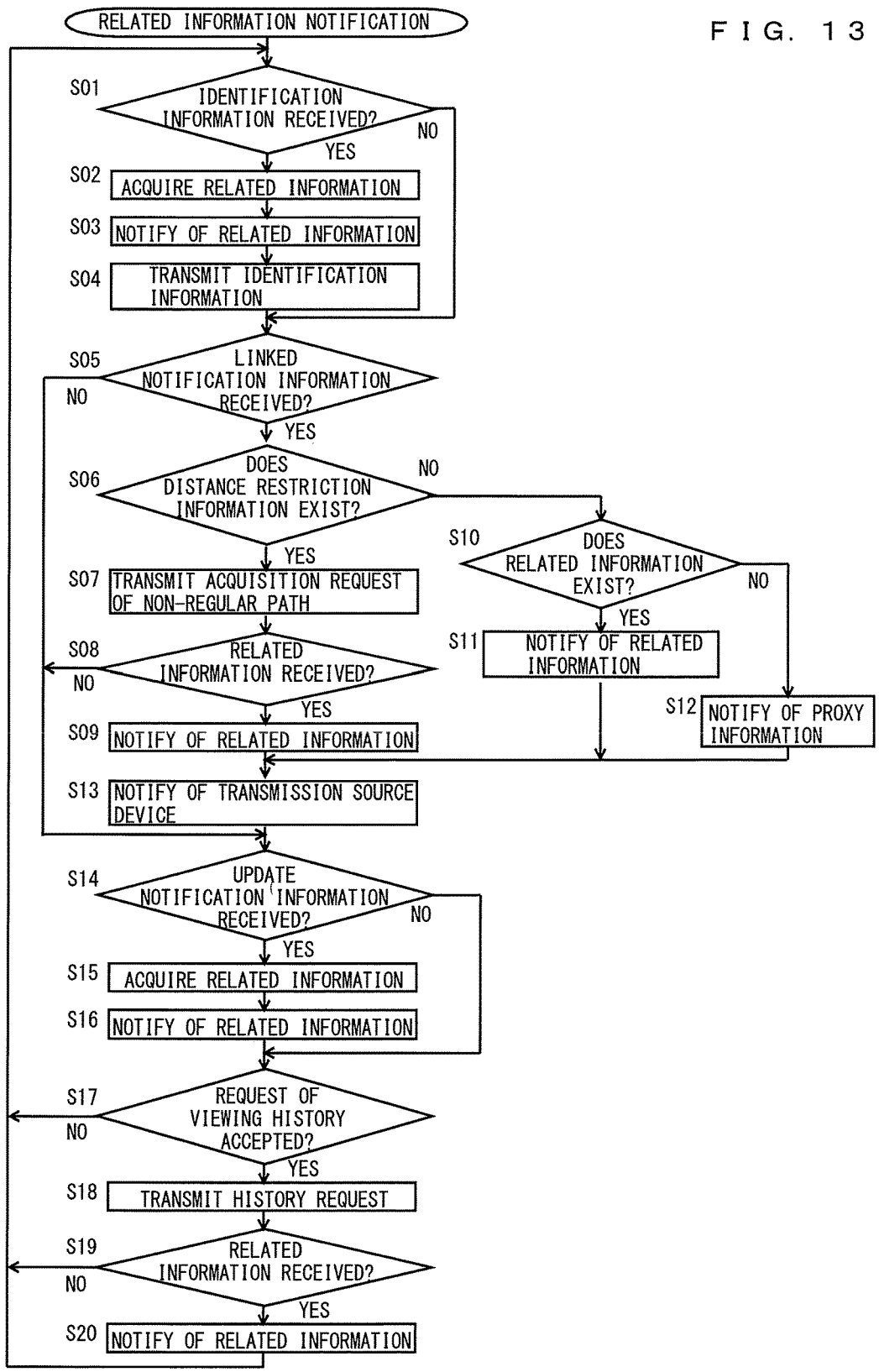
FIG. 13 is a flowchart illustrating an exemplary flow of a related information notification process.

FIG. 13 is a flowchart illustrating an exemplary flow of a related information notification process. The related information notification process is a process executed by the CPU 201 as the CPU 201 included in the smartphone 200 executes a related information notification program stored in the ROM or the flash memory 203 included in the CPU 201. Referring to FIG. 13, the CPU 201 determines whether or not the short range communication unit 209 receives the identification information from any one of the beacon terminals 301, 301A, 301B, 301C and 301D (step S01). If the identification information is received, the process proceeds to step S02; otherwise, the process proceeds to step S05. It is here assumed, by way of example, that the identification information L is received from the beacon terminal 301.

In step S02, the CPU 201 acquires the related information I corresponding to the identification information L. Specifically, the CPU 201 controls the wireless LAN I/F 208 to transmit the acquisition request including the identification information L to the information providing server 300, and receive the related information returned by the information providing server 300. In the following step S03, the CPU 201 notifies the user about the related information I acquired in step S02. For example, the CPU 201 displays the related information I in the display unit 206. Further, in the case where the related information I is voice data, the CPU 201 outputs from the speaker included in the call unit 205, voice which is reproduced from the voice data. In the following step S04, the CPU 201 controls the wireless LAN I/F 208 to transmit the identification information received in step S01 to the management server 100, and the process proceeds to step S05.

In step S05, the CPU 201 determines whether or not the wireless LAN I/F 208 receives the linked notification information from the management server 100. If the linked notification information is received, the process proceeds to step S06; otherwise, the process proceeds to step S14. There may be the cases: where the linked notification information includes the identification information and the device identification information of the transmission source device; and where the linked notification information includes the proxy information and the device identification information of the transmission source device. Further, if the linked notification information includes the identification information and the device identification information of the transmission source device, there may be the cases: the linked notification information includes the distance restriction information; and the linked notification information does not include the distance restriction information.

In step S06, the CPU 201 determines whether or not the linked notification information received in step S05 includes the distance restriction information. If the distance restriction information is included, the process proceeds to step S07; otherwise, the process proceeds to step S10. In step S07, the CPU 201 transmits an acquisition request of non-regular path. The acquisition request of non-regular path is an acquisition request including the acquisition path information indicating that an acquisition path of the identification information is not regular. Specifically, the CPU 201 controls the wireless LAN I/F 208 to transmit to the information providing server 300, the acquisition request including: the identification information included in the linked notification information received in step S05; and the acquisition path information indicating that the acquisition path of the identification information is not regular.

In the following step S08, the CPU 201 determines whether or not the wireless LAN I/F 208 receives the related information from the information providing server 300. If the related information is valid only for a device which exists within the range of a predetermined distance from the beacon terminal associated with the related information, the information providing server 300 may either return the related information or return nothing. If the related information is received from the information providing server 300, the process proceeds to step S09; otherwise, the process proceeds to step S14. In step S09, the CPU 201 notifies the user about the related information received in step S08. The CPU 201 displays, for example, the related information in the display unit 206. Further, in the case where the related information is voice data, the CPU 201 outputs from the speaker included in the call unit 205, voice which is reproduced from the voice data. In the following step S13, the CPU 201 notifies the user about the transmission source device, and the process proceeds to step S14. Specifically, the CPU 201 displays in the display unit 206, the device identification information included in the linked notification information received in step S05. Further, the CPU 201 may reproduce voice from the device identification information to output from the speaker included in the call unit 205.

In the case where the process proceeds to step S10, the linked notification information received in step S05 does not include the distance restriction information. In step S10, the CPU 201 determines whether or not the linked notification information includes the related information. If the linked notification information includes the related information, the process proceeds to step S11; otherwise, the process proceeds to step S12. In step S11, the CPU 201 notifies the user about the related information included in the linked notification information, and the process proceeds to step S13. The CPU 201 displays, for example, the related information in the display unit 206. In step S13, the CPU 201 notifies the user about the transmission source device, and the process proceeds to step S14. The CPU 201 displays in the display unit 206, the device identification information included in the linked notification information received in step S05.

In the case where the process proceeds to step S12, the linked notification information received in step S05 includes the proxy information. The proxy information is the information generated by the management server 100 in place of the related information. In step S12, the CPU 201 notifies the user about the proxy information included in the linked notification information, and the process proceeds to step S13. The CPU 201 displays, for example, the proxy information in the display unit 206. Further, in the case where the proxy information is voice data, the CPU 201 outputs from the speaker included in the call unit 205, voice which is reproduced from the voice data. In step S13, the CPU 201 notifies the user about the transmission source device, and the process proceeds to step S14. The CPU 201 displays in the display unit 206, the device identification information included in the linked notification information received in step S05.

In step S14, the CPU 201 determines whether or not the wireless LAN I/F 208 receives the update notification information from the management server 100. If the update notification information is received, the process proceeds to step S15; otherwise, the process proceeds to step S17. The update notification information includes the identification information, and indicates that related information corresponding to the identification information has been updated. In step S15, the CPU 201 acquires the related information corresponding to the identification information included in the update notification information. Specifically, the CPU 201 controls the wireless LAN I/F 208 to transmit to the information providing server 300, the acquisition request including the identification information included in the update notification information, and receive the related information returned by the information providing server 300. In the following step S16, the CPU 201 notifies the user about the related information acquired in step S15. The CPU 201 display, for example, the related information in the display unit 206. Further, in the case where the related information is voice data, the CPU 201 outputs from the speaker included in the call unit 205, voice which is reproduced from the voice data. This allows the user to know that the related information as viewed in the past has been updated, and to view the updated related information.

In step S17, the CPU 201 determines whether or not the request of viewing history is accepted. If the request of viewing history is accepted, the process proceeds to step S18; otherwise, the process returns to step S01. In the case where the operation unit 207 accepts an operation of requesting view of the history from the user, the CPU 201 accepts the request of viewing history. In step S18, the CPU 201 controls the wireless LAN I/F 208 to transmit the history request to the management server 100. The management server 100 receiving the history request then returns the related information which has been transmitted to the smartphone 200 in the past. In the following step S19, the CPU 201 determines whether or not the wireless LAN I/F 208 receives the related information from the management server 100. If the related information is received, the process proceeds to step S20; otherwise, the process returns to step S01. In step S20, the CPU 201 notifies the user about the related information, and the process returns to step S01. The CPU 201 displays, for example, the related information in the display unit 206. Further, in the case where the related information is voice data, the CPU 201 outputs from the speaker included in the call unit 205, voice which is reproduced from the voice data.

Figure 14:
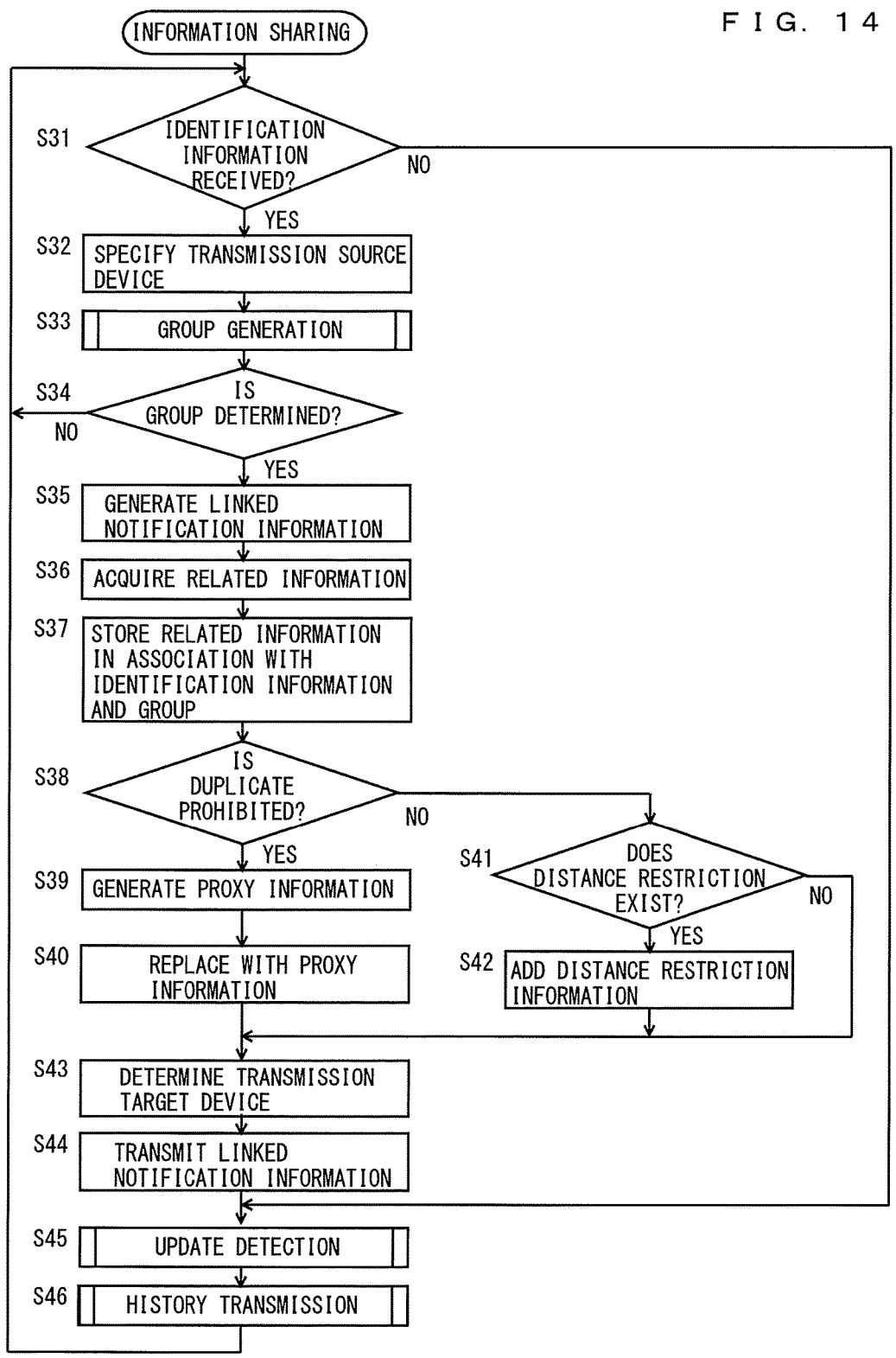
FIG. 14 is a flowchart illustrating an exemplary flow of an information sharing process.

FIG. 14 is a flowchart illustrating an exemplary flow of an information sharing process. The information sharing process is a process executed by the CPU 101 as the CPU 101 included in the management server 100 executes an information sharing program stored in the ROM 102, the HDD 104 or the CD-ROM 109. Referring to FIG. 14, the CPU 101 determines whether or not the communication unit 105 receives the identification information from any one of the smartphones 200, 200A and 200B (step S31). If the identification information is received, the process proceeds to step S32; otherwise, the process proceeds to step S45.

In step S32, the CPU 101 specifies the transmission source device which has transmitted the identification information. It is here assumed, by way of example, that the smartphone 200 is specified as the transmission source device. In the following step S33, the CPU 101 executes a group generation process, and the process proceeds to step S34. The group generation process, which will be described in detail later, is a process of generating or deleting more than any one of the position-based group, the terminal-based group and the limited-period group.

In step S34, the CPU 101 determines whether or not a group to which the transmission source device belongs is determined. If the group to which the transmission source device belongs is determined, the process proceeds to step S35; otherwise, the process returns to step S31. In the case where the group information including the device identification information of the transmission source device is stored in the HDD 104, the CPU 101 determines a group specified by the group identification information included in the group information; whereas in the case where the group information including the device identification information of the transmission source device is not stored in the HDD 104, the CPU 101 does not determine a group.

In step S35, the CPU 101 generates the linked notification information, and the process proceeds to step S36. The CPU 101 generates the linked notification information including the identification information received in step S31. In step S36, the CPU 101 acquires the related information corresponding to the identification information received in step S31. Specifically, the CPU 101 controls the communication unit 105 to transmit to the information providing server 300, the acquisition request including the identification information, and receive the related information returned by the information providing server 300 which receives the acquisition request. In the following step S37, the CPU 101 stores the related information acquired in step S36, in association with the identification information received in step S31 and the group determined in step S34. Specifically, the CPU 101 stores in the HDD 104, the related information, the identification information and the group identification information in association with each other.

In step S38, the CPU 101 determines whether or not it is prohibited to duplicate the relation information acquired in step S36. There may be the case where the information providing server 300 which has transmitted the acquisition request prohibits duplicating the related information. If duplicating of the related information is prohibited by the information providing server 300, the process proceeds to step S39; otherwise, the process proceeds to step S41. In step S39, the CPU 101 generates the proxy information. The proxy information includes: the device identification information of the transmission source device or/and the name of the user assigned to the transmission source device; and information related to the beacon terminal which has transmitted the identification information. The information related to the beacon terminal includes, for example, a geographical position of a place where the beacon terminal is provided. For example, the CPU 101 accesses the information providing server 300 on the basis of the identification information, and acquires the information related to the beacon terminal associated with the identification information. For example, in the case where "Terminal A" is the device identification information of the transmission source device, and "Shop X", which is the name of a shop where the beacon terminal is provided, is acquired as the information related to the beacon terminal, the CPU 101 generates as the proxy information, a message saying "Terminal A exits in Shop X". In the following step S40, the CPU 101 replaces with the proxy information, the identification information of the linked notification information generated in step S35, and the process proceeds to step S43.

Meanwhile, the process proceeds to step S41 in the case where it is not prohibited to duplicate the relation information. In step S41, the CPU 101 determines whether or not acquisition of the related information is restricted by the information providing server 300, depending on the distance from the beacon terminal. If the acquisition of the related information is restricted depending on the distance from the beacon terminal, the process proceeds to step S42; otherwise, the process proceeds to step S43. In step S42, the CPU 101 adds to the linked notification information generated in step S35, the distance restriction information indicating that the acquisition of the related information is restricted, and the process proceeds to step S43.

In step S43, the CPU 101 determines a transmission target device. Referring to the group information stored in the HDD 104, the CPU 101 specifies a plurality of devices which belong to the group determined in step S34, and determines as the transmission target device, a device other than the transmission source device among the specified plurality of devices. In the following step S44, the CPU 101 controls the communication unit 105 to transmit the linked notification information to the transmission target device, and the process proceeds to step S45. In step S45, the CPU 101 executes an update detection process, and the process proceeds to step S46. In step S46, the CPU 101 executes a history transmission process, and the process returns to step S31. The update detection process and the history transmission process will be described in detail later.

Figure 15:
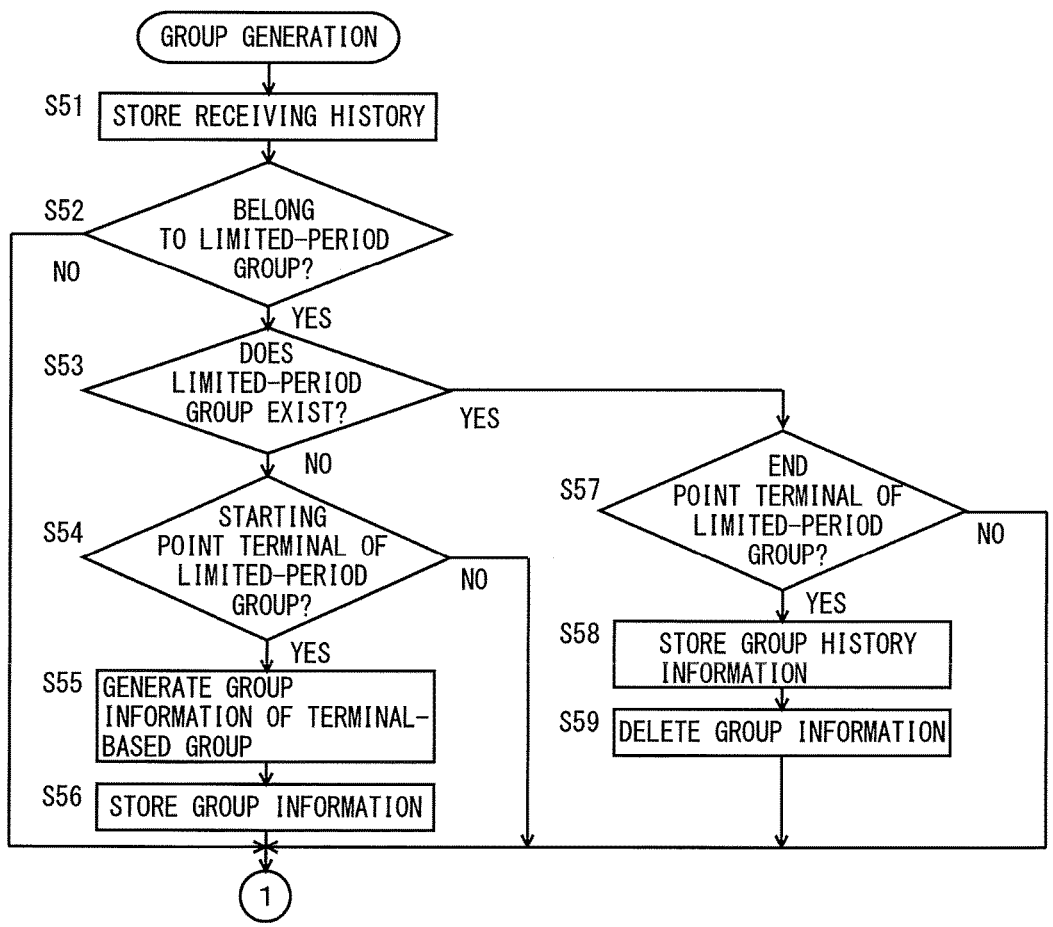
FIG. 15 is a first flowchart illustrating an exemplary flow of a group generation process.
Figure 16:
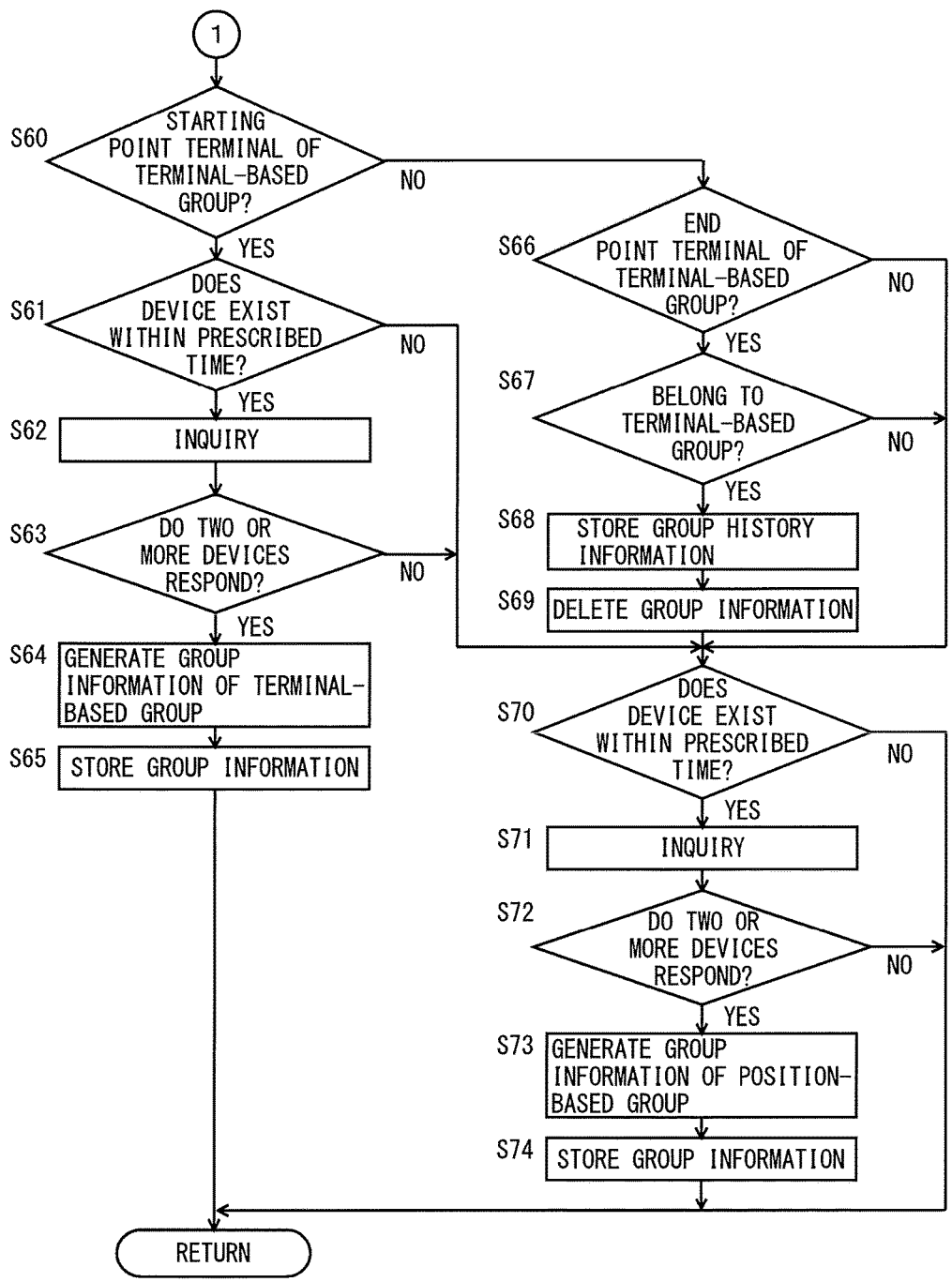
FIG. 16 is a second flowchart illustrating an exemplary flow of a group generation process.

FIGS. 15 and 16 are flowcharts each illustrating an exemplary flow of a group generation process. The group generation process is a process executed in step S33 of the information sharing process. At a stage before the group generation process is executed, the identification information as a process target is received, and the transmission source device which has transmitted the identification information is specified. Referring to FIG. 15 and FIG. 16, the CPU 101 stores a receiving history in the HDD 104 (step S51). The receiving history includes: the device identification information of the transmission source device; the identification information that the transmission source device has transmitted; and the date and time when the identification information is received.

In the following step S52, the CPU 101 determines whether or not the transmission source device belongs to the limited-period group. If a registered device having the same device identification information as the device identification information of the transmission source device exists among a plurality of registered devices determined by the limited-period group generation rule, the CPU 101 determines that the transmission source device belongs to the limited-period group. If the transmission source device belongs to the limited-period group, the process proceeds to step S53; otherwise, the process proceeds to step S60.

In step S53, the CPU 101 determines whether or not the limited-period group is generated for existence. If the group information corresponding to the limited-period group exists among a plurality of pieces of the group information stored in the HDD 104, the CPU 101 determines that the limited-period group has already been generated. If the limited-period group exists, the process proceeds to step S57; otherwise, the process proceeds to step S54.

In step S54, the CPU 101 determines whether or not the beacon terminal associated with the identification information set as the process target is set as a starting point terminal by the limited-period group generation rule. If the beacon terminal associated with the identification information is set as the starting point terminal, the process proceeds to step S55; otherwise, the process proceeds to step S60. In step S55, the CPU 101 generates the group information of the limited-period group, and the process proceeds to step S56. The CPU 101 generates the group information including: the device identification information of the plurality of registered devices determined by the limited-period group generation rule; and the group identification information for identifying the limited-period group information. In step S56, the CPU 101 stores the generated group information in the HDD 104, and the process proceeds to step S60.

Meanwhile, in the case where the process proceeds to step S57, steps S54 through S56 have been executed and the group information of the limited-period group is stored in the HDD 104. In step S57, the CPU 101 determines whether or not the beacon terminal assigned to the identification information set as the process target is set as an end point terminal by the limited-period group generation rule. If the beacon terminal assigned to the identification information is set as the end point terminal, the process proceeds to step S58; otherwise, the process proceeds to step S60. In step S58, the CPU 101 stores in the HDD 104, the group history information duplicated from the group information of the limited-period group stored in the HDD 104, and the process proceeds to step S59. In step S59, the CPU 101 deletes from the HDD 104, the group information of the limited-period group stored in the HDD 104, and the process proceeds to step S60.

In step S60, the CPU 101 determines whether or not the beacon terminal associated with the identification information set as the process target is set as a starting point terminal by the terminal-based group generation rule. If the beacon terminal associated with the identification information is set as the starting point terminal, the process proceeds to step S61; otherwise, the process proceeds to step S66. In step S61, the CPU 101 determines whether or not there exits during a period long as of a prescribed time prior to the date and time when the identification information set as the process target has been received, a device which has transmitted the same identification information as the identification information set as the process target. The CPU 101 extracts from among a plurality of pieces of the receiving history stored in the HDD 104, the receiving history including: the same identification information as the identification information set as the process target; and the date and time after the time as of the prescribed time prior to the present date and time. If such receiving history is extracted, the process proceeds to step S62; otherwise, the process proceeds to step S70.

In step S62, the CPU 101 makes an inquiry to each of the devices specified by the device identification information included in the receiving history extracted in step S61, about whether to agree to be grouped. The devices as inquiry destinations include the transmission source device. In step S63, as a result of the inquiry, the CPU 101 determines whether or not two or more of the devices respond with agreement to be grouped. If two or more of the devices respond with agreement to be grouped, the process proceeds to step S64; otherwise, the process proceeds to step S70.

In step S64, the CPU 101 generates the group information of the terminal-based group, and the process proceeds to step S65. The CPU 101 generates the group information including: the device identification information of two or more of the devices which have transmitted a response with agreement to be grouped; and the group identification information for identifying the terminal-based group. In step S65, the CPU 101 stores in the HDD 104, the group information generated in step S64, and the process returns to the information sharing process.

In step S66, the CPU 101 determines whether or not the beacon terminal associated with the identification information set as the process target is set as an end point terminal by the terminal-based group generation rule. If the beacon terminal associated with the identification information is set as the end point terminal, the process proceeds to step S67; otherwise, the process proceeds to step S70. In step S67, the CPU 101 determines whether or not the transmission source device belongs to the terminal-based group. There may be the case where steps S61 through S65 have been executed at a stage before the process proceeds to step S66, and then the group information of the terminal-based group is stored in the HDD 104. If the group information of the terminal-based group is stored in the HDD 104, and the same device identification information as the device identification information of the transmission source device is included the group information, the CPU 101 determines that the transmission source device belongs to the terminal-based group. If the transmission source device belongs to the terminal-based group, the process proceeds to step S68; otherwise, the process proceeds to step S70.

In step 68, the CPU 101 stores in the HDD 104, the group history information duplicated from the group information of the terminal-based group stored in the HDD 104, and the process proceeds to step S69. In step S69, the CPU 101 deletes the group information of the terminal-based group stored in the HDD 104, and the process proceeds to step S70.

In step S70, the CPU 101 determines whether or not there exits during a period long as of a prescribed time prior to the date and time when the identification information set as the process target has been received, a device which has transmitted the same identification information as the identification information set as the process target. The CPU 101 extracts from among a plurality of pieces of the receiving history stored in the HDD 104, the receiving history including: the same identification information as the identification information set as the process target; and the date and time after the time as of the prescribed time prior to the present date and time. If such receiving history is extracted, the process proceeds to step S71; otherwise, the process returns to the information sharing process.

In step S71, the CPU 101 makes an inquiry to each of the devices specified by the device identification information included in the receiving history extracted in step S70, about whether to agree to be grouped. The devices as inquiry destinations include the transmission source device. In step S72, as a result of the inquiry, the CPU 101 determines whether or not two or more of the devices respond with agreement to be grouped. If two or more of the devices respond with agreement to be grouped, the process proceeds to step S73; otherwise, the process returns to the information sharing process.

In step S73, the CPU 101 generates the group information of the position-based group, and the process proceeds to step S74. The CPU 101 generates the group information including: the device identification information of two or more of the devices which have transmitted a response with agreement to be grouped; and the group identification information for identifying the position-based group. In step S74, the CPU 101 stores in the HDD 104, the group information generated in step S73, and the process returns to the information sharing process.

Figure 17:
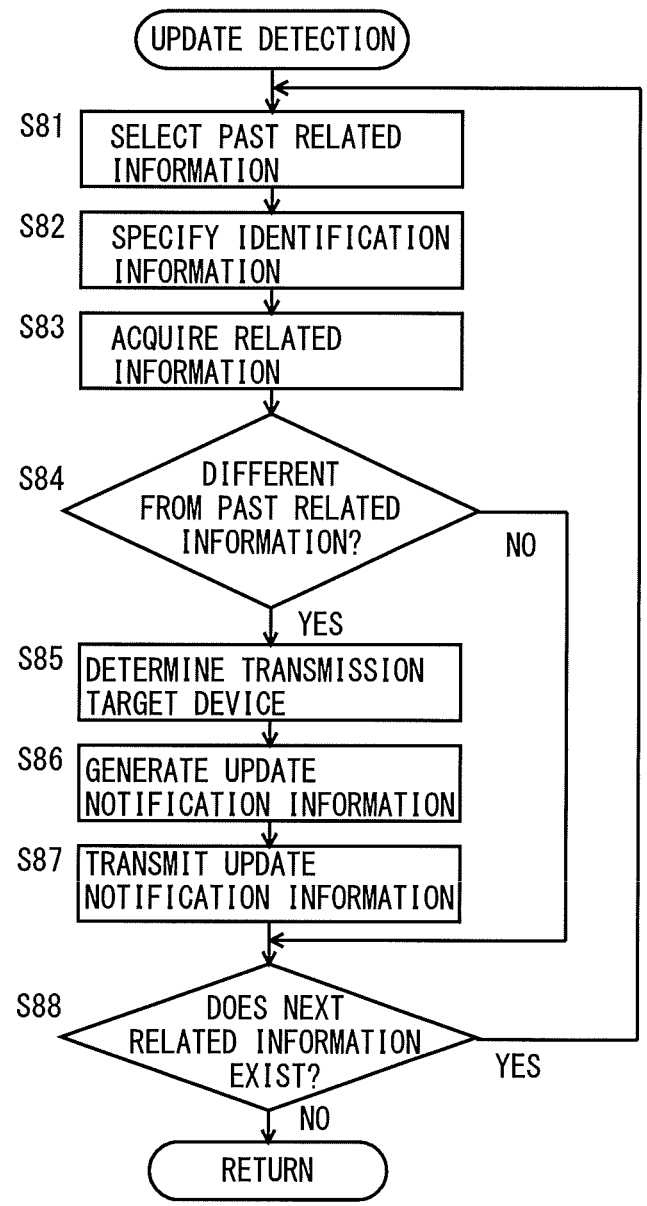
FIG. 17 is a flowchart illustrating an exemplary flow of an update detection process.

FIG. 17 is a flowchart illustrating an exemplary flow of an update detection process. The update detection process is a process executed in step S45 of the information sharing process. Referring to FIG. 17, the CPU 101 selects any one of a plurality of pieces of the related information received in the past (step S81), and the process proceeds to step S82. In step S37 of the information sharing process, the related information is stored in the HDD 104 in association with a group, and the CPU 101 therefore selects as the process target, any one of the plurality of pieces of the related information stored in the HDD 104.

In step S82, the CPU 101 specifies the identification information associated with the related information selected as the process target. In the following step S83, the CPU 101 acquires the related information corresponding to the identification information specified in step S82. Specifically, the CPU 101 controls the communication unit 105 to transmit to the information providing server 300, the acquisition request including the identification information, and receive the related information returned by the information providing server 300 which receives the acquisition request.

In the following step S84, the CPU 101 determines whether or not the related information acquired in step S83 is different from the related information in the past. The CPU 101 compares the related information acquired in step S83 with the related information selected in step S81. If the related information acquired in step S83 is different from the related information selected in step S81, the process proceeds to step S85; otherwise, the process proceeds to step S88.

In the following step S85, the CPU 101 determines a transmission target device. The CPU 101 determines as the transmission target devices, all of the devices which belong to the group associated with the related information selected as the process target in step S81. In the following step S86, the CPU 101 generates the update notification information including the identification information specified in step S82. In the following step S87, the CPU 101 controls the communication unit 105 to transmit the update notification information to all of the transmission target devices determined in step S85, and the process proceeds to step S88. In step S88, the CPU 101 determines whether or not there exists a piece of the related information which is not selected. If the related information which is not selected as the process target in step S81 is stored in the HDD 104, the process returns to step S81; if the non-selected related information is not stored in the HDD 104, the process returns to the information sharing process.

Figure 18:
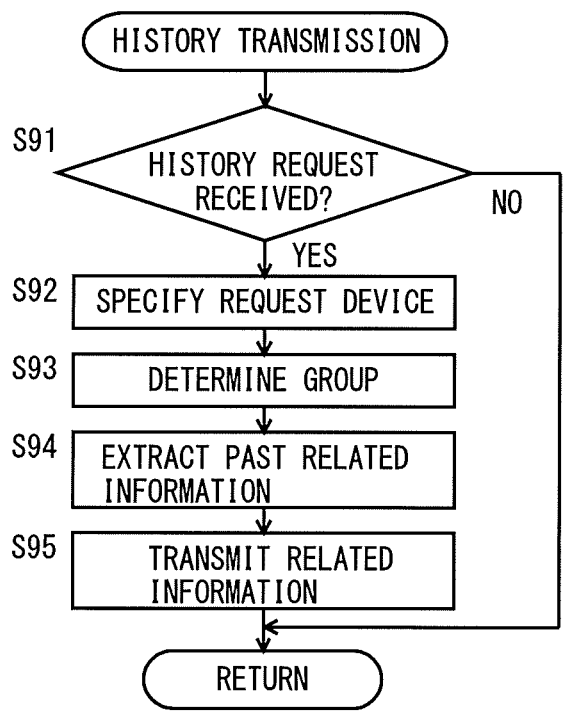
FIG. 18 is a flowchart illustrating an exemplary flow of a history transmission process.

FIG. 18 is a flowchart illustrating an exemplary flow of a history transmission process. The history transmission process is a process executed in step S46 of the information sharing process. Referring to FIG. 18, the CPU 101 determines whether or not the communication unit 105 receives a history request from any one of the smartphones 200, 200A and 200B (step S91). If the history request is received, the process proceeds to step S92; otherwise, the process returns to the information sharing process. In step S92, the CPU 101 specifies a request device which has transmitted the history request. It is here assumed, by way of example, that the history request is received from the smartphone 200. In this case, the CPU 101 determines that the smartphone 200 is the request device. In the following step S93, the CPU 101 refers to the group information and the group history information stored in the HDD 104, and determines a group to which the request device belongs. Then, the CPU 101 extracts as the past related information, the related information associated with the group determined in step S93, from among a plurality of pieces of the related information stored in the HDD 104 in step S37 of the information sharing process. In the following step S95, the CPU 101 controls the communication unit 105 to transmit to the request device specified in step S92, the related information extracted in step S94, and the process returns to the information sharing process.

Modified Embodiment

In the above described embodiment, as the function of the CPU 101 included in the management server 100 as shown in FIG. 5, the user-setting group generating portion 71 generates the user-setting group to which the registered device set by any of the user A, the user B and the user C belongs. The user-setting group generating portion 71 according to the modified embodiment generates the user-setting group at a start timing previously determined, and deletes the user-setting group at an end timing previously determined.

FIG. 19 is a diagram showing an example of a start timing setting screen. Referring to FIG. 19, the start timing setting screen includes: an item "DESIGNATE TIME"; an item "START MANUALLY"; and an item "START WITH BEACON TERMINAL". Any one of the items "DESIGNATE TIME", "START MANUALLY" and "START WITH BEACON TERMINAL" is selectable.

The item "DESIGNATE TIME" includes an area for setting a start time. The start time indicates a period from the time when the registered device is registered until the time when the user-setting group is generated. In the case where a checkbox of the item "DESIGNATE TIME" is marked by the user, the start time is effectively set in a start timing determination rule.

In the case where a checkbox of the item "START MANUALLY" is marked by the user, the date and time at the point of being marked by the user is set in the start timing determination rule.

The item "START WITH BEACON TERMINAL" includes: an area for setting a starting point terminal; and a button "SET BEACON TERMINAL" below the area for setting the starting point terminal. If the button "SET BEACON TERMINAL" is designated, the beacon terminal setting screen as shown in FIG. 10 is displayed. In the case where a checkbox of the item "START WITH BEACON TERMINAL" is marked by the user, the starting point terminal is set in the start timing determination rule.

FIG. 20 is a diagram showing an example of an end timing setting screen. Referring to FIG. 20, the end timing setting screen includes: an item "NON RECEIVED TIME INTERVAL"; an item "END MANUALLY"; and an item "END WITH BEACON TERMINAL". Any one of the items "NON RECEIVED TIME INTERVAL", "END MANUALLY" and "END WITH BEACON TERMINAL" is selectable.

The item "NON RECEIVED TIME INTERVAL" includes an area for setting a non received time. The non received time indicates a period during which the identification information is not received as the condition for finishing the user-setting group after the user-setting group has been generated. In the case where a checkbox of the item "NON RECEIVED TIME INTERVAL" is marked by the user, the non received time is set in an end timing determination rule.

In the case where a checkbox of the item "END MANUALLY" is marked by the user, the date and time at the point of being marked by the user is set in the end timing determination rule.

The item "END WITH BEACON TERMINAL" includes: an area for setting an end point terminal; and a button "SET BEACON TERMINAL" below the area for setting the end point terminal. If the button "SET BEACON TERMINAL" is designated, the beacon terminal setting screen as shown in FIG. 10 is displayed. In the case where a checkbox of the item "END WITH BEACON TERMINAL" is marked by the user, the end point terminal is set in the end timing determination rule.

The user-setting group generation portion 71 according to the modified embodiment determines the registered device designated by the user in the user-setting group setting screen as shown in FIG. 6. It is here assumed, by way of example, that the smartphones 200, 200A and 200B are designated as the registered devices by the user.

The user-setting group generation portion 71 according to the modified embodiment generates the user-setting group in accordance with the start timing determination rule set by the user. In the case where the start time is set in the start timing determination rule, the user-setting group generation portion 71 according to the modified embodiment generates the user-setting group when the start time elapses after the registered device has been set. In the case where the date and time at the point of being marked by the user is set in the start timing determination rule, the user-setting group generation portion 71 according to the modified embodiment generates the user-setting group at the point of above date and time. In the case where the starting point terminal is set in the start timing determination rule, the user-setting group generation portion 71 according to the modified embodiment generates the user-setting group in response to an event that a pair of the device identification information of any one of a plurality of the registered devices, the smartphones 200, 200A and 200B here, and the identification information associated with the starting point terminal, is input from the identification information receiving portion 53.

Upon generating of the user-setting group, the user-setting group generation portion 71 according to the modified embodiment stores in the HDD 104, the group information including: the group identification information for identifying the user-setting group; and the device identification information for identifying each of the plurality of the registered devices which belong to the group, each of the smartphones 200, 200A and 200B here.

After generation the user-setting group, the user-setting group generation portion 71 according to the modified embodiment deletes the user-setting group in accordance with the end timing determination rule set by the user. In the case where the non received time is set in the end timing determination rule, the user-setting group generation portion 71 according to the modified embodiment deletes the user-setting group when the non received time elapses after no pair including the device identification information of any one of the plurality of the registered devices has been input from the identification information receiving portion 53. In the case where the date and time at the point of being marked by the user is set in the end timing determination rule, the user-setting group generation portion 71 according to the modified embodiment deletes the user-setting group at the point of above date and time. In the case where the end point terminal is set in the end timing determination rule, the user-setting group generation portion 71 according to the modified embodiment deletes the user-setting group in response to an event that a pair of the device identification information of any one of a plurality of the registered devices, and the identification information associated with the end point terminal, is input from the identification information receiving portion 53.

Upon deleting the user-setting group, the user-setting group generation portion 71 stores as the group history information in the HDD 104, the group information including the group identification information for identifying the user-setting group, among a plurality of pieces of the group information stored in the HDD 104. Accordingly, the user-setting group generation portion 71 deletes the group information from the HDD 104.

Figure 21:
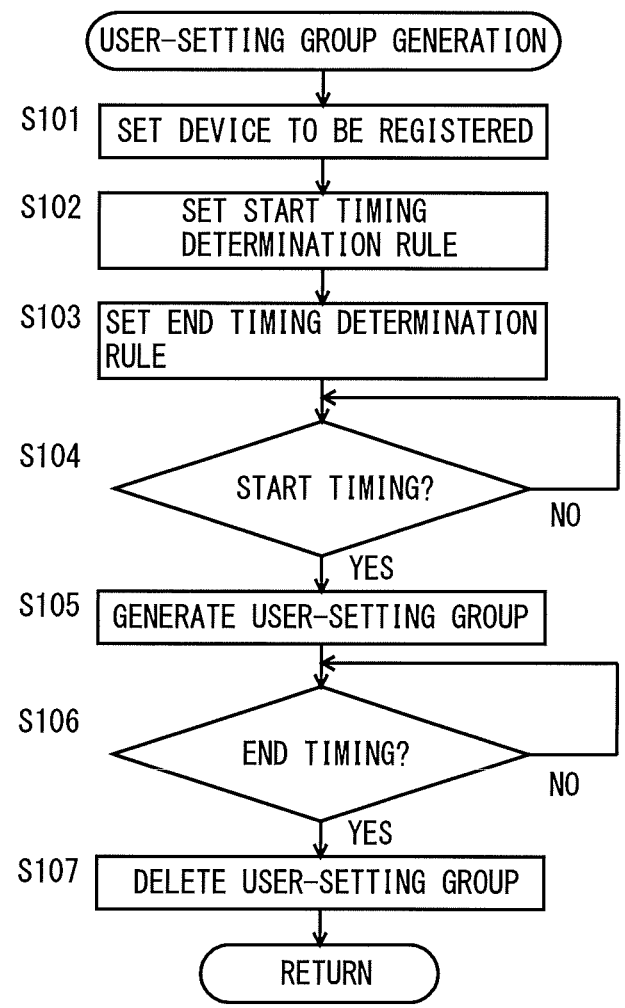
FIG. 21 is a flowchart illustrating an exemplary flow of a user-setting group generation process.

FIG. 21 is a flowchart illustrating an exemplary flow of a user-setting group generation process. The user-setting group generation process is a process executed by the CPU 101 as the CPU 101 included in the management server 100 executes a user-setting generation program stored in the ROM 102, the HDD 104 or the CD-ROM 109, and the process is executed in parallel with the information sharing process. The user-setting group generation program is part of the information sharing program according to the modified embodiment.

Referring to FIG. 21, the CPU 101 sets a registered device, which is designated by the user in the user-setting group setting screen as shown in FIG. 6 (step S101). It is here assumed, by way of example, that the smartphones 200, 200A and 200B are set as the registered devices.

In step S102, the CPU 101 sets the start timing determination rule. The CPU 101 generates the start timing determination rule on the basis of the start timing set by the user in the start timing setting screen as shown in FIG. 19. The CPU 101 sets: the start time in the start timing determination rule in the case where the checkbox of the item "START TIME" in the start timing setting screen is marked by the user; the date and time at the point of being marked by the user in the start timing determination rule in the case where the checkbox of the item "START MANUALLY" in the start timing setting screen is marked by the user; and the starting point terminal in the start timing determination rule in the case where the checkbox of the item "START WITH BEACON TERMINAL" in the start timing setting screen is marked by the user.

In step S103, the CPU 101 sets the end timing determination rule. The CPU 101 sets: the end time in the end timing determination rule in the case where the checkbox of the item "NON RECEIVED TIME INTERVAL" in the end timing setting screen as shown in FIG. 20 is marked by the user; the date and time at the point of being marked by the user in the end timing determination rule in the case where the checkbox of the item "END MANUALLY" in the end timing setting screen is marked by the user; and the end point terminal in the end timing determination rule in the case where the checkbox of the item "END WITH BEACON TERMINAL" in the end timing setting screen is marked by the user.

In the following step S104, the CPU 101 determines whether or not the start timing is detected. In the case where the start time is set in the start timing determination rule, the CPU 101 detects the start timing when the start time elapses after the registered device has been set. In the case where the date and time at the point of being marked by the user is set in the start timing determination rule, the CPU 101 detects the start timing at above date and time. In the case where the starting point terminal is set in the start timing determination rule, the CPU 101 detects the start timing upon receiving the identification information associated with the starting point terminal from any one of the plurality of the registered devices. The CPU 101 is in a waiting state until the start timing is detected (NO in step S104); and if the start timing is detected (YES in step S104), the process proceeds to step S105.

In step S105, the CPU 101 generates the user-setting group, and the process proceeds to step S106. Specifically, the CPU 101 stores in the HDD 104, the group information including: the group identification information for identifying the user-setting group; and the device identification information for identifying each of the plurality of the registered devices set in the step S101.

In step S106, the CPU 101 determines whether or not the end timing is detected. In the case where the non received time is set in the end timing determination rule, the CPU 101 detects the end timing when the non received time elapses after no the identification information has been received from any one of the plurality of the registered devices set in step S101. In the case where the date and time at the point of being marked by the user is set in the end timing determination rule, the CPU 101 detects the end timing at above date and time. In the case where the end point terminal is set in the end timing determination rule, the CPU 101 detects the end timing upon receiving the identification information associated with the end point terminal from any one of the plurality of the registered devices set in step S101. The CPU 101 is in a waiting state until the end timing is detected (NO in step S106); and if the end timing is detected (YES in step S105), the process proceeds to step S107.

In step S107, the CPU 101 deletes the user-setting group generated in step S105, and the process ends. The CPU 101 stores as the group history information in the HDD 104, the group information including the group identification information for identifying the user-setting group generated in step S105, among the plurality of pieces of the group information stored in the HDD 104. Accordingly, the CPU 101 deletes the group information from the HDD 104.

First Embodiment

In the first embodiment, it is assumed, by way of example, that the user A, the user B and the user C are a family, and go together to a shopping mall. Before they leave home, the user A registers as the user-setting group in the management server 100, the smartphones 200, 200A and 200B which are respectively carried by the user A, the user B and the user C. Each of the beacon terminals 301, 301A, 301B, 301C and 301D is provided at each of a plurality of tables in a food court of the shopping mall. Further, each of the beacon terminals 301, 301A, 301B, 301C and 301D transmits the identification information indicating a position in which the related information corresponding to the table is stored.

Figure 22:
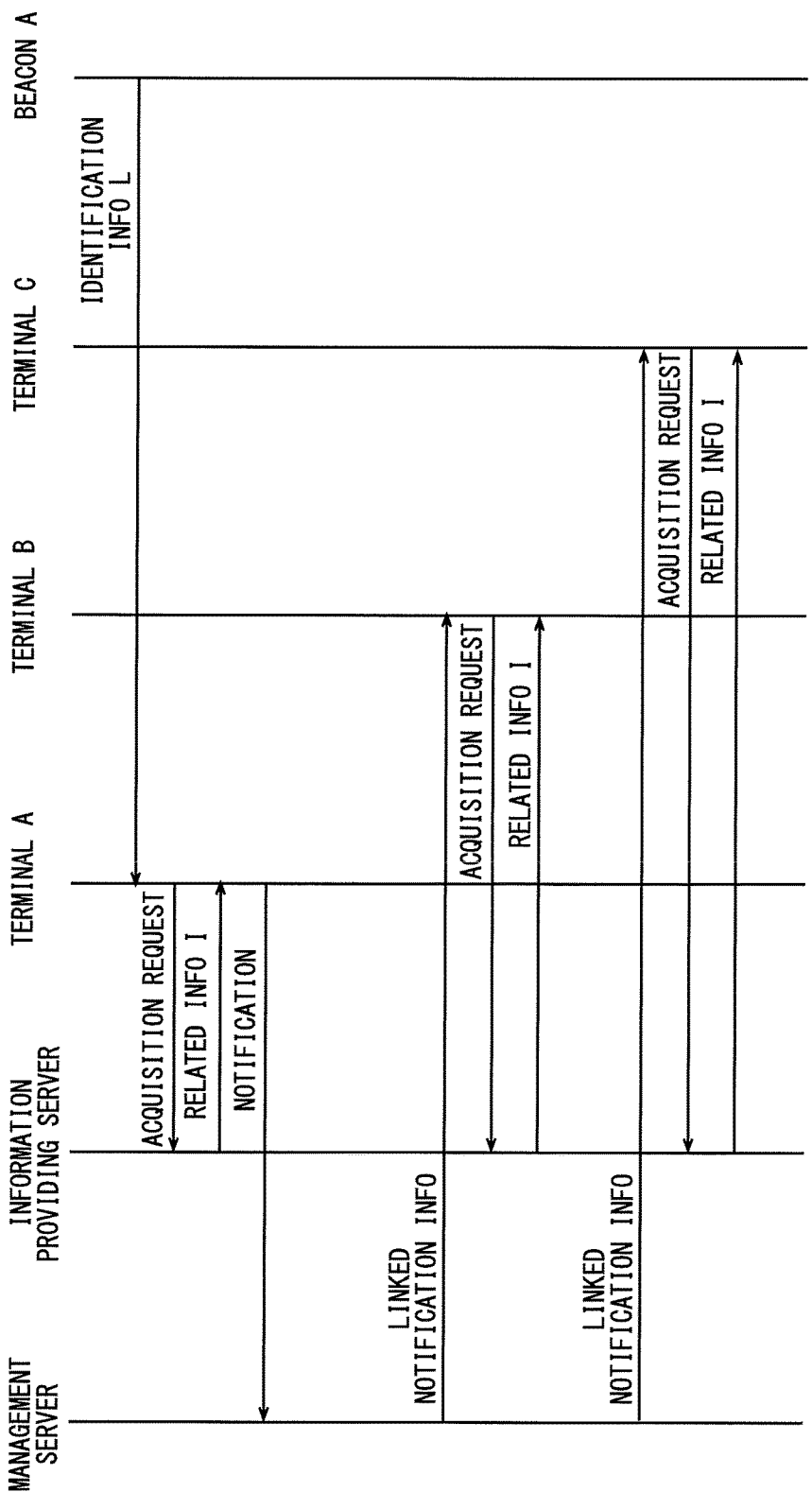
FIG. 22 is a diagram showing an exemplary flow of a signal in a first embodiment.

FIG. 22 is a diagram showing an exemplary flow of a signal in the first embodiment. In FIG. 22, there are shown as follows: the management server 100 as "MANAGEMENT SERVER"; the information providing server 300 as "INFORMATION PROVIDING SERVER"; the smartphone 200 as "TERMINAL A"; the smartphone 200A as "TERMINAL B"; the smartphone 200B as "TERMINAL C"; and the beacon terminal 301 as "BEACON A". Further, in FIG. 22, elapse of the time is shown as vertical lines from top to bottom.

Referring to FIG. 22, the food court of the shopping mall is crowded with a large number of dining tables, shops for providing meals and customers. The user A is in charge of obtaining available seats, and the user B and the user C are looking sequentially the shops in the food court for ordering meals.

In the case where the user A finds a vacant table A and comes closer thereto, the smartphone 200 carried by the user A receives the identification information L from the beacon terminal 301 provided at the table A, and then transmits the acquisition request including the received identification information L to the information providing server 300. In response to receipt of the acquisition request, the information providing server 300 returns the related information I corresponding to the identification information L. Accordingly, the smartphone 200 receives for display the related information I from the information providing server 300. Here, the related information I corresponding to the identification information L is a message corresponding to the table A, specifically, saying "Table A is now occupied for use".

Meanwhile, the smartphone 200 notifies the management server 100 of the identification information L received from the beacon terminal 301 provided at the table A. In response to receipt of the identification information L from the smartphone 200, as the smartphone 200 which has transmitted the identification information L belongs to the user-setting group previously set, the management server 100 transmits the linked notification information to the smartphones 200A and 200B which belong to the same user-setting group as the smartphone 200. The linked notification information includes: the device identification information of the smartphone 200; and the identification information L received from the smartphone 200.

Each of the smartphones 200A and 200B transmits to the information providing server 300, the acquisition request including the identification information L included in the linked notification information received from the management server 100, and receives for display the related information I from the information providing server 300. The related information I corresponding to the identification information L is the message "Table A is now occupied for use", and this allows the user B and the user C to know that the user A obtained the table A. Therefore, after buying the meals at a shop in the food court, the user B and the user C may move directly to the table A so as to join the user A.

Second Embodiment

In the second embodiment, it is assumed that the management server 100 sets in the position-based group generation rule that the generation period of time is "1" minute and the maximum number of devices is "5".

Figure 23:
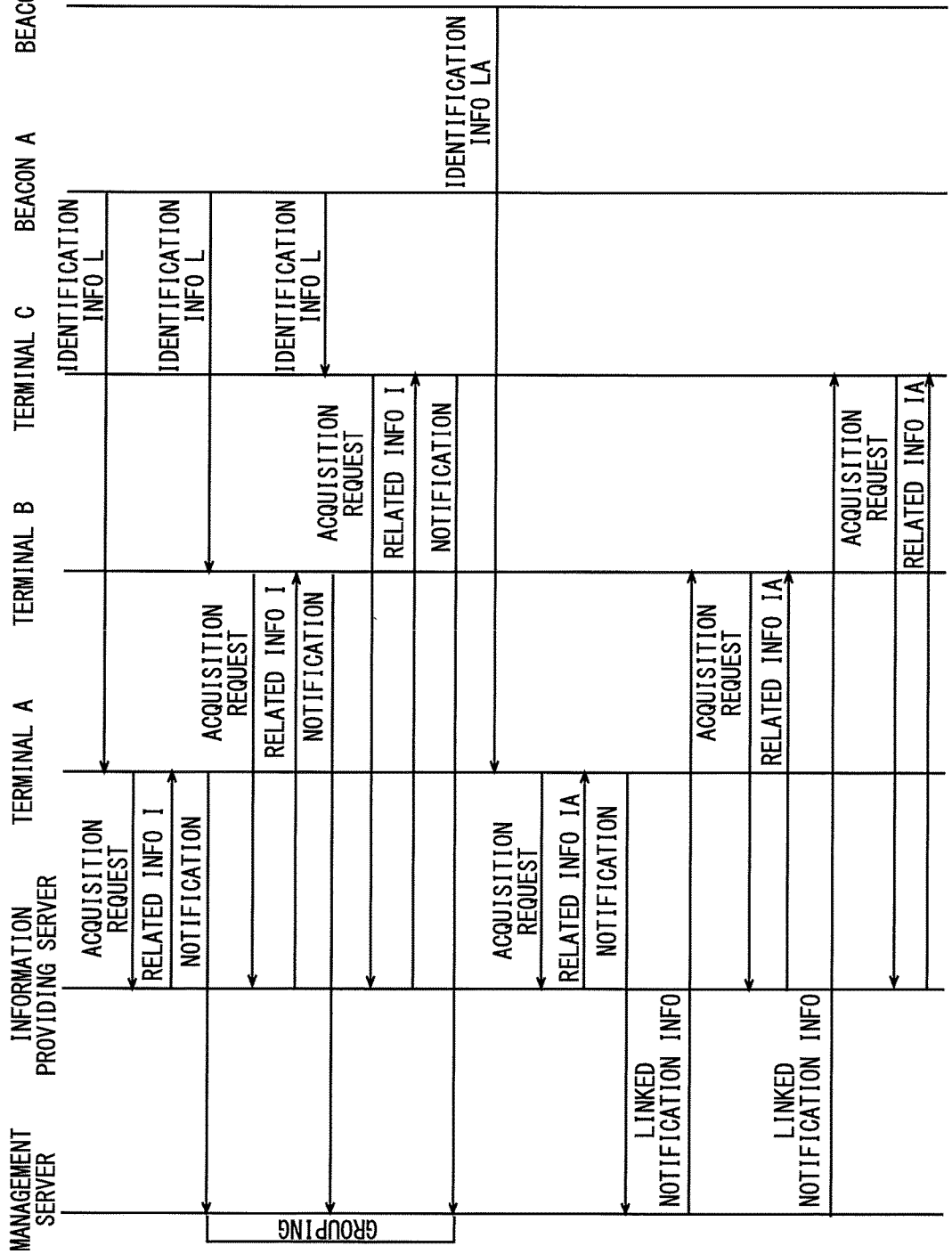
FIG. 23 is a diagram showing an exemplary flow of a signal in a second embodiment.

FIG. 23 is a diagram showing an exemplary flow of a signal in the second embodiment. In FIG. 23, there are shown as follows: the management server 100 as "MANAGEMENT SERVER"; the information providing server 300 as "INFORMATION PROVIDING SERVER"; the smartphone 200 as "TERMINAL A"; the smartphone 200A as "TERMINAL B"; the smartphone 200B as "TERMINAL C"; the beacon terminal 301 as "BEACON A"; and the beacon terminal 301A as "BEACON B". Further, in FIG. 23, elapse of the time is shown as vertical lines from top to bottom.

Referring to FIG. 23, in the case where a family of the user A, the user B and the user C passes through the entrance of an amusement facility such as a theme park, the smartphones 200, 200A and 200B which are respectively carried by the user A, the user B and the user C receive the same identification information L almost simultaneously from the beacon terminal 301 provided at the entrance. In this case, upon receiving the identification information L from the beacon terminal 301 provided at the entrance, each of the smartphones 200, 200A and 200B transmits the acquisition request including the identification information L to the information providing server 300. In response to receipt of the acquisition request, the information providing server 300 returns the related information I corresponding to the identification information L. Accordingly, each of the smartphones 200, 200A and 200B receives for display the related information I from the information providing server 300. Further, each of the smartphones 200, 200A and 200B transmits to the management server 100, the identification information L received from the beacon terminal 301 provided at the entrance.

As the management server 100 receives the same identification information almost simultaneously from the smartphones 200, 200A and 200B, the management server 100 generates the position-based group including the smartphones 200, 200A and 200B, and stores in the HDD 104, the group information of the generated position-based group.

Afterwards, in the case where the user A becomes separated from the user B and the user C in the amusement facility, when the user A comes to a square Y in the amusement facility, the smartphone 200 receives the identification information LA from the beacon terminal 301A provided in the square Y. In response to receipt of the identification information LA from the beacon terminal 301A, the smartphone 200 transmits the acquisition request including the identification information LA to the information providing server 300. In response to receipt of the acquisition request, the information providing server 300 returns the related information IA corresponding to the identification information LA. Accordingly, the smartphone 200 receives for display the related information IA from the information providing 300. Further, the smartphone 200 transmits to the management server 100, the identification information LA received from the beacon terminal 301A.

The related information IA corresponding to the identification information LA output by the beacon terminal 301A provided in the square Y is, for example, an advertisement of the square Y. In response to receipt of the identification information LA from the smartphone 200, as the smartphone 200 which has transmitted the identification information LA belongs to the position-based group previously set, the management server 100 transmits the linked notification information to the smartphones 200A and 200B which belong to the same position-based group as the smartphone 200. The linked notification information includes: the device identification information of the smartphone 200; and the identification information LA received from the smartphone 200.

Each of the smartphones 200A and 200B transmits to the information providing server 300, the acquisition request including the identification information LA included in the linked notification information received from the management server 100, and receives for display the related information IA from the information providing server 300. The related information IA is the advertisement of the square Y, and this allows the user B and the user C to know that the user A is now in the square Y. After that, the user B and the user C may move directly to the square Y so as to join the user A.

Yet, the management server 100 may be capable of: based on the identification information L received from the smartphone 200, acquiring from the information providing server 300 a position of the beacon terminal 301 to which the identification information L is assigned; based on the identification information LA, acquiring from the information providing server 300 a position of the beacon terminal 301A to which the identification information LA is assigned; calculating a distance between the beacon terminal 301 provided at the entrance and the beacon terminal 301A provided in the square Y; and transmitting with the related information, the calculated distance to the smartphones 200A and 200B. In this case, the distance to the square Y may be displayed with the advertisement of the square Y in the smartphones 200A and 200B, and this allows the user B and the user C to know the distance from the present position to the square Y in addition to that the user A is now in the square Y.

Third Embodiment

In the third embodiment, the user C is in charge of managing schedules of the user A and the user B. Further, the user C registers as the user-setting group in the management server 100, the smartphones 200, 200A and 200B which are respectively carried by the user A, the user B and the user C.

FIG. 24 is a diagram showing an exemplary flow of a signal in the third embodiment. In FIG. 24, there are shown as follows: the management server 100 as "MANAGEMENT SERVER"; the information providing server 300 as "INFORMATION PROVIDING SERVER"; the smartphone 200 as "TERMINAL A"; the smartphone 200A as "TERMINAL B"; the smartphone 200B as "TERMINAL C"; and the beacon terminal 301 as "BEACON A". Further, in FIG. 24, elapse of the time is shown as vertical lines from top to bottom.

When the user A and the user B visit a lecture venue on business, each of the smartphones 200 and 200A receives the identification information L from the beacon terminal 301 provided at the lecture venue, and then transmits the acquisition request including the identification information L to the information providing server 300. In response to receipt of the acquisition request, the information providing server 300 returns the related information I corresponding to the identification information L. Accordingly, each of the smartphones 200 and 200A receives for display the related information I from the information providing server 300. Here, the related information corresponding to the identification information output from the beacon terminal 301 is a guide for a lecture scheduled on a later date.

Each of the smartphones 200 and 200A transmits to the management server 100, the identification information L received from the beacon terminal 301 provided at the lecture venue. In response to receipt of the identification information L from each of the smartphones 200 and 200A, as the smartphones 200 and 200A which had transmitted the identification information L belong to the user-setting group previously set, the management server 100 transmits the received identification information L to the smartphone 200B which belong to the same user-setting group as the smartphones 200 and 200A. In this case, the management server 100 receives the identification information L from each of the smartphones 200 and 200A respectively, however, the transmission destination of the identification information L is the smartphone 200B only. Therefore, it is sufficient to transmit only once the identification information to the smartphone 200B.

The smartphone 200B uses the identification information L received from the management server 100, and transmits the acquisition request including the identification information L to the information providing server 300. In response to receipt of the acquisition request, the information providing server 300 returns the related information I. Accordingly, the smartphone 200B receives for display the related information I from the information providing server 300. As the related information I is a guide for a lecture scheduled on a later date, the user C may set the lecture scheduled on a later date to the schedules of the user A and the user B.

In response to receipt of the identification information L from each of the smartphones 200 and 200A, the management server 100 receives the related information I from the information providing server 300, and stores the received related information I in association with the identification information L and the user-setting group to which the smartphones 200 and 200A belong. Each time the period determined by the confirmation frequency set as the update conditions elapses, starting from the date and time when the identification information L is received from each of the smartphones 200 and 200A, the management server 100 transmits to the information providing server 300, the acquisition request including the identification information L associated with the user-setting group, and receives the related information I corresponding to the identification information L from the information providing server 300. The management server 100 compares related information I' which is newly acquired, with the related information I which is stored, thereby determining whether or not the related information I has been updated. In the case of determining that the related information I has been updated, the management server 100 transmits to each of the smartphones 200, 200A and 200B, the update notification information including the identification information L and indicating that the related information I has been updated.

Each of the smartphones 200, 200A and 200B, which receives the update notification information, transmits to the information providing server 300, the acquisition request including the identification information L included in the notification information. In response to receipt of the acquisition request, the information providing server 300 returns the related information I' corresponding to the identification information L. Accordingly, each of the smartphones 200, 200A and 200B receives for display the related information I' from the information providing server 300. Therefore, the user A, the user B and the user C may view the guide for a lecture which has been updated, in spite of being absent from the lecture venue. Further, on the basis of the updated guide for a lecture, the user C may change the schedules for the user A and the user B according to the updated schedule for a lecture.

In response to receipt of the update notification information from the management server 100, each of the smartphones 200, 200A and 200B acquires for display the related information I' from the information providing server 300. At that time, there may be the case where the user A, the user B and the user C are unable to view the displayed related information I'. In this case, if the user C inputs an operation of requesting view of history to the smartphone 200B, for example, the smartphone 200B transmits a request of history to the management server 100. In response to receipt of the request of history from the smartphone 200B, the management server 100 returns the related information I' which has been transmitted in the past to the smartphone 200B. Accordingly, the smartphone 200B displays the past related information I' received from the management server 100. This allows the user C to display the related information I' at its convenient time. Further, it is not necessary for the smartphone 200B to store the related information I', and this may prevent increasing a storage capacity of the smartphone 200B.

Fourth Embodiment

There may be the case where it is undesirable for an information provider who manages the beacon terminal to allow the related information to be viewed by a user being far from the beacon terminal. Such a case may be seen, for example, in a customer service to distribute a visiting point only to a customer who actually visit a shop, another customer service called a stamp rally, and the like.

In the case mentioned above, the information providing server 300 is configured to issue the visiting points to a customer on the condition that the identification information is received from the beacon terminal 301.

FIG. 25 is a diagram showing an exemplary flow of a signal in a fourth embodiment. In FIG. 25, there are shown as follows: the management server 100 as "MANAGEMENT SERVER"; the information providing server 300 as "INFORMATION PROVIDING SERVER"; the smartphone 200 as "TERMINAL A"; the smartphone 200A as "TERMINAL B"; the smartphone 200B as "TERMINAL C"; and the beacon terminal 301 as "BEACON A". Further, in FIG. 25, elapse of the time is shown as vertical lines from top to bottom.

Referring to FIG. 25, in response to receipt of the identification information L from the beacon terminal 301 provided in a shop, the smartphone 200 carried by the user A transmits the acquisition request including the identification information L to the information providing server 300. In response to receipt of the acquisition request, the information providing server 300 returns the related information I corresponding to the identification information L. At this stage, the information providing server 300 offers the visiting points to the user associated with the smartphone 200. The smartphone 200 receives for display the related information I from the information providing server 300.

Meanwhile, the smartphone 200 notifies the management server 100 of the identification information L received from the beacon terminal 301. In response to receipt of the identification information L from the smartphone 200, the management server 100 transmits the acquisition request including the identification information L to the information management server 300. In response to receipt of the acquisition request, the information providing server 300 returns the related information I corresponding to the identification information L, and the distance restriction signal. Accordingly, the management server 100 receives the related information I and the district restriction signal from the information providing server 300.

The management server 100 transmits the linked notification information including the identification information L and the district restriction information, to another devices belonging to the same group as the smartphone 200 which has transmitted the identification information L, the smartphones 200A and 200B here. Further, in response to receipt of the linked notification information, each of the smartphones 200A and 200B transmits to the information providing server 300, the acquisition request including: the identification information L included in the linked notification information; and the acquisition path information indicating that the acquisition path is not regular. Upon receiving from any one of the smartphones 200A and 200B the acquisition request including the acquisition path information indicating that the acquisition path is not regular, the information providing server 300 returns the related information I without offering the visiting points. Each of the smartphones 200A and 200B receives for display the related information I from the information providing server 300.

Fifth Embodiment

There may be the case where it is undesirable for an information provider who manages the beacon terminal to allow the related information associated with the beacon terminal to be duplicated. Such a case may be, for example, where viewing is restricted only to a customer who actually visit a shop. In this case, the information providing server 300 is configured to prohibit duplicating of the related information.

FIG. 26 is a diagram showing an exemplary flow of a signal in a fifth embodiment. In FIG. 26, there are shown as follows: the management server 100 as "MANAGEMENT SERVER"; the information providing server 300 as "INFORMATION PROVIDING SERVER"; the smartphone 200 as "TERMINAL A"; the smartphone 200A as "TERMINAL B"; the smartphone 200B as "TERMINAL C"; and the beacon terminal 301 as "BEACON A". Further, in FIG. 26, elapse of the time is shown as vertical lines from top to bottom.

Referring to FIG. 26, in response to receipt of the identification information L from the beacon terminal 301 provided in a shop, the smartphone 200 carried by the user A transmits the acquisition request including the identification information L to the information providing server 300. In response to receipt of the acquisition request, the information providing server 300 returns the related information I corresponding to the identification information L. Accordingly, the smartphone 200 receives for display the related information I from the information providing server 300.

Meanwhile, the smartphone 200 notifies the management server 100 of the identification information L received from the beacon terminal 301. In response to receipt of the identification information L from the smartphone 200, the management server 100 transmits the acquisition request including the identification information L to the information providing server 300. In the case where it is prohibited to duplicate the related information I corresponding to the identification information L, in response to receipt of the acquisition request from the management server 100, the information providing server 300 returns the related information I and the duplicate prohibition signal indicating prohibition of duplicating the related information.

In response to receipt of the related information I and the duplicate prohibition signal from the information providing server 300, the management server 100 accesses the information providing server 300, acquires information indicating a position where the beacon terminal 301 associated with the identification information L is provided, and generates the proxy information from the acquired information. For example, in the case where the management server 100 acquires from the information providing server 300, the name of a shop where the beacon terminal 301 associated with the identification information L is provided, the management server 100 generates from the name of the smartphone 200 "Terminal A" and the name of the shop "Shop X" where the beacon terminal is provided, a message saying "Terminal A exists in the shop X" as the proxy information. Then, in the case where the smartphones 200A and 200B belong to the same group as the smartphone 200, the management server 100 transmits the linked notification information including the proxy information to the smartphones 200A and 200B.

In response to receipt of the proxy information from the management server 100, each of the smartphones 200A and 200B displays the proxy information. Therefore, this may prevent the related information L associated with the beacon terminal 301 from being duplicated, as well as allow notifying the user B and the user C that the user A in the same group exits in the shop X.

As described above, in the information sharing system 1 according to the present embodiments, any one of the smartphones 200, 200A and 200B, for example, the smartphone 200 receives the identification information from any one of the beacon terminals 301, 301A and 302B, for example, the beacon terminal 301; acquires the related information corresponding to the identification information from the information providing server 300; and transmits the identification information to the management server 100. The management server 100 generates the group to which two or more of the smartphones 200, 200A and 200B belong; and in response to receipt of the identification information from the smartphone 200, determines the group to which the smartphone 200 belongs. In the case of determining the user-setting group to which the smartphones 200, 200A and 200B belong, for example, the management server 100 transmits the linked notification information including the identification information received from the smartphone 200 as the transmission source device, to each of the smartphones 200A and 200B other than the smartphone 200 as the transmission source device among the smartphones 200, 200A and 200B which belong to the user-setting group. In response to receipt of the linked notification information from the management server 100, each of the smartphones 200A and 200B acquires from the information providing server 300, the related information corresponding to the identification information included in the linked notification information, to notify the user. Therefore, in response to an event that the smartphone 200 which belongs to the user-setting group receives the identification information from the beacon terminal 301, the same related information is notified to each of the users of the smartphones 200, 200A and 200B which belong to the user-setting group. In other words, each of the smartphones 200A and 200B which do not exist within the range of a predetermined distance from the beacon terminal 301 notifies each of the users of the same related information as the smartphone 200 which exists within the range of a predetermined distance from the beacon terminal 301. This allows a plurality of the users to share the same related information regardless of the positions. Further, the same related information is notified to each of the users of the smartphones 200, 200A and 200B which belong the user-setting group. Therefore, as long as the user-setting group is determined, it is not necessary for the user to designate another user for sharing the information.

Further, the management server 100 transmits to each of the smartphones 200A and 200B, the identification information and the linked notification information including the device identification information for identifying the smartphone 200 as the transmission source device, and each of the smartphones 200A and 200B which receives the linked notification information notifies each of the users of the smartphone 200 identified by the device identification information included in the linked notification information received from the management server 100. The related information is the information which is associated with the beacon terminal 301 and relates to the place where the beacon terminal 301 is provided. This allows each of the users of the smartphones 200A and 200B to know from the related information, the position of the user who carries the smartphone 200 as the transmission source device.

Further, the management server 100 acquires from the information providing server 300, the related information corresponding to the identification information received from the smartphone 200 as the transmission source device, and stores the acquired related information and the identification information in association with the determined user-setting group. This allows storing the related information and identification information transmitted in the past, for each of the user-setting groups.

Further, in response to an event that it is detected that the stored related information has been updated, the management server 100 transmits the update notification information including the identification information stored in association with the related information, to all of the smartphones 200, 200A and 200B which belong to the user-setting group stored in association with the related information. This allows notifying each of the users who respectively carries the smartphones 200, 200A and 200B which belong to the user-setting group, that the related information corresponding to the identification information transmitted in the past has been updated.

Further, in response to a request from any one of the smartphones 200, 200A and 200B, for example, the smartphone 200 here, the management server 100 transmits the related information stored in association with the user-setting group to which the smartphone 200 belongs. This allows the smartphone 200 to again notify the related information which has been notified to the user in the past.

Further, the management server 100 generates the position-based group to which two or more of the smartphones 200, 200A and 200B which have transmitted the same identification information within a predetermined period of time belong. This allows automatically classifying into the same position-based group, a plurality of devices among the smartphones 200, 200A and 200B which exist within the range of a predetermined distance from, for example, the beacon terminal 301, during a predetermined period of time.

Further, upon generating the position-based group, the management server 100 makes an inquiry to a plurality of devices among the smartphones 200, 200A and 200B which exist within the range of a predetermined distance from, for example, the beacon terminal 301, during a predetermined period of time, about whether to agree to be grouped. Then, the management server 100 generates the position-based group on the condition that two or more of the plurality of devices to which the inquiry about whether to agree to be grouped has been made respond with agreement to be grouped. This allows the user to determine whether to share the related information with another users.

In the case where in accordance with the terminal-based group generation rule in which, for example, the beacon terminal 301 is set as the starting point terminal and the beacon terminal 301D is set as the end point terminal, two or more of the smartphones 200, 200A and 200B transmit within a predetermined period of time, the identification information assigned to the beacon terminal 301 as the starting point terminal, the management server 100 generates the terminal-based group to which two or more of devices which have transmitted the identification information assigned to the starting point terminal, for example, the smartphones 200 and 200A, belong. After generation of the terminal-based group, in response to an event that the identification information assigned to the beacon terminal 301D as the end point terminal is received from any one of the smartphones 200 and 200A which belong to the terminal-based group, the management server 100 deletes the terminal-based group. Therefore, the terminal-based group is generated as long as the starting point terminal and the end point terminal are set. This allows automatically generating the terminal-based group to which the plurality of devices, the smartphones 200 and 200A, belong.

Further, upon generating the terminal-based group, the management server 100 makes an inquiry to the smartphones 200 and 200A among the smartphones 200, 200A and 200B which exist within the range of a predetermined distance from the beacon terminal 301 as the starting point terminal, during a predetermined period of time, about whether to agree to be grouped. Then, the management server 100 generates the terminal-based group on the condition that two or more of the smartphones 200 and 200A to which the inquiry about whether to agree to be grouped has been made respond with agreement to be grouped. This allows the user to determine whether to share the related information with another users.

Further, in response to an even that, in accordance with the limited-period group generation rule in which, for example, the smartphones 200, 200A and 200B are set as the registered devices; the beacon terminal 301 is set as the starting point terminal; and the beacon terminal 301D is set as the end point terminal, the identification information assigned to the beacon terminal 301 as the starting point terminal is received from any one of the smartphones 200, 200A and 200B which belong to the limited-period group, the management server 100 generates the limited-period group to which the smartphones 200, 200A and 200B belong. After generation of the limited-period group, in response to an event that the identification information assigned to the beacon terminal 301D as the end point terminal is received from any one of the smartphones 200, 200A and 200B which belong to the limited-period group, the management server 100 deletes the limited-period group. Therefore, the limited-period group is generated as long as the smartphones 200, 200A and 200B as the registered devices, the beacon terminal 301 as the starting point terminal and the beacon terminal 301D as the end point terminal are set. This allows automatically generating the limited-period group to which the smartphones 200, 200A and 200B belong.

Further, in the case where it is prohibited to duplicate the related information by the information providing server 300, the management server 100 transmits, without transmitting the related information, the proxy information indicating the position of the smartphone 200 as the transmission source device on the basis of the identification information. This allows notifying another users, such as the user B and the user C of the position of the user A who carries the smartphone 200.

Further, in the case where the related information associated with the beacon terminal, for example, the beacon terminal 301 is set in the management server 300 to be effective only within the range of a predetermined distance from the beacon terminal 301, the management server 100 transmits the identification information and the distance restriction information. In the case where the identification information and the distance restriction information are received from the management server 100, upon receiving the related information corresponding to the identification information from the information providing server 300, each of the smartphones 200, 200A and 200B transmits to the information providing server 300 the acquisition path indicating that the acquisition path of the identification information is different from the beacon terminal 301. This can prevent the related information from being notified to the user who does not exist within the range of a predetermined distance from the beacon terminal 301 in the case where the related information is set in the management server 300 to be effective only within the range of a predetermined distance from the beacon terminal 301. Further, this can prevent providing services of, for example, offering points and other services different from providing information, to the user who does not exist within the range of a predetermined distance.

While each of the smartphones 200, 200A and 200B has been described as an example of the portable information device in the above embodiment, the portable information device may be a device carried by the user, for example, a personal digital assistant (PDA) such as a smart watch and the like.

Although information sharing system 1 has been described in the foregoing embodiments, it is needless to say that the present invention can be specified as an information sharing method that allows the management server 100 to perform the information sharing process shown in FIG. 14 through FIG. 18 and allows each of the smartphones 200, 200A and 200B to perform the the related information notification process shown in FIG. 13. Further, it is needless to say that the present invention can be specified as an information sharing program that controls the management server 100 to perform the information sharing process shown in FIG. 14 through FIG. 18.

Although the present invention has been described and illustrated in detail, it is clearly understood that the same is by way of illustrated and example only and is not to be taken by way limitation, the scope of the present invention being interpreted by terms of the appended claims.

What is claimed is:

1. An information sharing system comprising:
    an information providing server;
    a plurality of fixed terminals each located geographically at a fixed position;
    a management server; and
    a plurality of portable information devices, wherein
    each of said plurality of portable information devices includes a first hardware processor,
    said first hardware processor includes
        an identification information receiving portion configured to receive from any one of said plurality of fixed terminals, identification information corresponding to related information assigned to the fixed terminal,
        a related information acquiring portion configured to acquire the related information corresponding to said identification information from said information providing server, in response to receipt of said identification information,
        a notification portion configured to notify a user of the related information acquired by said related information acquiring portion, and
        an identification information transmitting portion configured to transmit said received identification information to said management server, in response to receipt of said identification information,
    said management server includes a second hardware processor,
    said second hardware processor includes
        a group generating portion configured to generate a group to which two or more of said plurality of portable information devices belong,
        a group determining portion configured to, in response to receipt of said identification information from any one of said plurality of portable information devices, determine from among said generated groups, a group to which a transmission source device, which has transmitted said identification information among said plurality of portable information devices, belongs, and
        a linked transmitting portion configured to, in response to receipt of said identification information, transmit said identification information received from said transmission source device to each of one or more portable information devices other than said transmission source device among the plurality of portable information devices which belong to said group determined,
    said first hardware processor further includes
        a linked acquiring portion configured to, in response to receipt of said identification information from said management server, acquire from said information providing server, the related information corresponding to said identification information received from said management server, and
        a linked notification portion configured to notify a user of the related information acquired by said linked acquiring portion.

2. The information sharing system according to claim 1, wherein
    each of said plurality of fixed terminals is a beacon terminal which transmits said identification information within a range of a communicable distance.

3. The information sharing system according to claim 1, wherein:
    said linked transmitting portion included in said second hardware processor is configured to transmit with said identification information, device identification information for identifying said transmission source device; and
    said first hardware processor further includes a transmission source device notification portion configured to further notify a user of the transmission source device identified by said device identification information received with said identification information from said management server.

4. The information sharing system according to claim 1, wherein
    said second hardware processor further includes:
        a proxy acquiring portion configured to acquire the related information corresponding to said identification information in response to receipt of said identification information from said transmission source device; and
        a related information storing portion configured to store said acquired related information, said identification information and said determined group in association with each other.

5. The information sharing system according to claim 4, wherein
    said second hardware processor further includes:
        an update detecting portion configured to detect that the related information stored in said information providing server has been updated; and
        an update notification information transmitting portion configured to, in response to an event that said update detecting portion detects that said related information has been updated, transmit update notification information including said identification information stored in association with said related information to all of the plurality of portable information devices which belong to said group stored in association with said related information.

6. The information sharing system according to claim 4, wherein
    said second hardware processor further includes a history transmitting portion configured to, in response to a request from any one of said plurality of portable information devices, transmit said related information stored in association with a group to which said portable information device which has transmitted the request belongs.

7. The information sharing system according to claim 1, wherein
said group generating portion includes a position-based group generating portion configured to generate a position-based group to which two or more of the portable information devices which have transmitted the same identification information within a predetermined period of time.

8. The information sharing system according to claim 7, wherein:
said group generating portion further includes an inquiry portion configured to makes an inquiry to two or more of the portable information devices which have transmitted the same identification information within a predetermined period of time, about whether to agree to be grouped; and
said position-based group generating portion is configured to generate said position-based group on the condition that two or more portable information devices among said two or more of the portable information devices respond with agreement to be grouped.

9. The information sharing system according to claim 1, wherein
said group generating portion includes a terminal-based group generating portion configured to generate a terminal-based group in which a starting point terminal and an end point terminal are set from among said plurality of fixed terminals; and
said terminal-based group generating portion is configured to generate the terminal-based group to which two or more of the portable information devices which have transmitted the identification information assigned to said starting point terminal within a predetermined period of time, and after generation of said terminal-based group, delete said terminal-based group in response to an event that the identification information assigned to said end point terminal is received from any one of two or more of the portable information devices which belong to said terminal-based group.

10. The information sharing system according to claim 9, wherein
said group generating portion further includes an inquiry portion configured to makes an inquiry to two or more of the portable information devices which have transmitted the same identification information within a predetermined period of time, about whether to agree to be grouped; and
said terminal-based group generating portion is configured to generate said terminal-based group on the condition that two or more portable information devices among said two or more of the portable information devices respond with agreement to be grouped.

11. The information sharing system according to claim 1, wherein
said group generating portion includes a limited-period group generating portion configured to generate a limited-period group to which two or more of said plurality of portable information devices belong as well as in which a starting point terminal and an end point terminal are set from among said plurality of fixed terminals; and said limited-period group generating portion is configured to generate said limited-period group in response to an event that the identification information assigned to said starting point terminal is received from any one of two or more of the portable information devices which belong to said limited-period group, and after generation of said limited-period group, delete said limited-period group in response to an event that the identification information assigned to said end point terminal is received from any one of two or more of the portable information devices which belong to said limited-period group.

12. The information sharing system according to claim 1, wherein
said linked transmitting portion included in said second hardware processor is configured to, in the case where it is prohibited to duplicate the related information stored in a position specified by said identification information received from said transmission source device, generate on the basis of said identification information, proxy information indicating a position of said transmission source device, and transmit said proxy information in place of said identification information.

13. The information sharing system according to claim 1, wherein
said linked transmitting portion included in said second hardware processor is configured to transmit distance restriction information with said identification information in the case where the related information corresponding to said identification information received from said transmission source device is effective only within a range of a predetermined distance from said fixed terminal which has transmitted said identification information; and
said linked acquiring portion included in said first hardware processor is configured to, in the case where said distance restriction information is received with said identification information from said management server, upon acquiring said related information corresponding to said identification information, transmit acquisition path information indicating that an acquisition path of said identification information is different from a path from said fixed terminal.

14. An information sharing method performed in an information sharing system including an information providing server, a plurality of fixed terminals each located geographically at a fixed position, a management server, and a plurality of portable information devices, wherein
the method causes each of said plurality of portable information devices to perform:
an identification information receiving step of receiving from any one of said plurality of fixed terminals, identification information corresponding to related information assigned to the fixed terminal;
a related information acquiring step of acquiring the related information corresponding to said identification information from said information providing server, in response to receipt of said identification information;
a notification step of notifying a user of the related information acquired in said related information acquiring step; and
an identification information transmitting step of transmitting said received identification information to said management server, in response to receipt of said identification information, the method further causes said management server to perform:
   a group generating step of generating a group to which two or more of said plurality of portable information devices belong;
   a group determining step of, in response to receipt of said identification information from any one of said plurality of portable information devices, determining from among said generated groups, a group to which a transmission source device, which has transmitted said identification information among said plurality of portable information devices, belongs; and
   a linked transmitting step of, in response to receipt of said identification information, transmitting said identification information received from said transmission source device to each of one or more portable information devices other than said transmission source device among the plurality of portable information devices which belong to said group determined,
the method further causes each of said plurality of portable information devices to perform:
   a linked acquiring step of, in response to receipt of said identification information from said management server, acquiring from said information providing server, the related information corresponding to said identification information received from said management server; and
   a linked notification step of notifying a user of the related information acquired in said linked acquiring step.

15. A management server capable of communicating with a plurality of portable information devices, wherein
   said management server includes a hardware processor, and
   said hardware processor includes:
      a group generating portion configured to generate a group to which two or more of said plurality of portable information devices belong;
      an identification information receiving portion configured to receive said identification information from a transmission source device among said plurality of portable information devices, which receives from any one of a plurality of fixed terminals each located geographically at a fixed position, identification information corresponding to related information assigned to the fixed terminal;
      a group determining portion configured to, in response to receipt of said identification information from said transmission source device, determine a group to which said transmission source device belongs from among said generated groups; and
      a linked transmitting portion configured to transmit said identification information received from said transmission source device, in order to allow each of one or more portable information devices other than said transmission source device among the plurality of portable information devices which belong to said group determined, to display the related information corresponding to said identification information received from said transmission source device.

16. An information sharing method performed by a management server capable of communicating with a plurality of portable information devices, the method causing said management server to perform:
   a group generating step of generating a group to which two or more of said plurality of portable information devices belong;
   an identification information receiving step of receiving said identification information from a transmission source device among said plurality of portable information devices, which receives from any one of a plurality of fixed terminals each located geographically at a fixed position, identification information corresponding to related information assigned to the fixed terminal;
   a group determining step of, in response to receipt of said identification information from said transmission source device, determining a group to which said transmission source device belongs from among said generated groups; and
   a linked transmitting step of transmitting said identification information received from said transmission source device, in order to allow each of one or more portable information devices other than said transmission source device among the plurality of portable information devices which belong to said group determined, to display the related information corresponding to said identification information received from said transmission source device.

17. A non-transitory computer-readable recording medium encoded with an information sharing program, the information sharing program causing a computer controlling a management server capable of communicating with a plurality of portable information devices to perform the information sharing method of claim 16.

* * * * *